US 7,740,895 B2

(12) United States Patent
Eckhoff et al.

(10) Patent No.: US 7,740,895 B2
(45) Date of Patent: Jun. 22, 2010

(54) NIXTAMALIZATION PROCESS AND PRODUCTS PRODUCED THEREFROM

(75) Inventors: Steven Eckhoff, Savoy, IL (US); Edith Oliva Cuevas Rodriguez, Sinaloa (MX); Jorge Milan Carrillo, Sinaloa (MX)

(73) Assignee: The Board of Trustees of the University of Illinois, Urbana, IL (US)

( * ) Notice: Subject to any disclaimer, the term of this patent is extended or adjusted under 35 U.S.C. 154(b) by 629 days.

(21) Appl. No.: 11/068,066

(22) Filed: Feb. 28, 2005

(65) Prior Publication Data

US 2006/0193964 A1 Aug. 31, 2006

(51) Int. Cl.
*A23L 1/10* (2006.01)
(52) U.S. Cl. .................... 426/622; 426/463; 426/478; 426/507; 426/520; 426/626
(58) Field of Classification Search ............ 426/622, 426/463, 478, 520, 507, 626
See application file for complete search history.

(56) References Cited

U.S. PATENT DOCUMENTS

| | | | |
|---|---|---|---|
| 3,859,452 A * | 1/1975 | Mendoza | ............... 426/622 |
| 4,594,260 A | 6/1986 | Vaqueiro et al. | |
| 5,532,013 A | 7/1996 | Martinez-Bustos et al. | |
| 5,558,898 A | 9/1996 | Sunderland | |
| 5,652,010 A | 7/1997 | Gimmler et al. | |
| 6,025,011 A | 2/2000 | Wilkinson et al. | |
| 6,056,990 A | 5/2000 | Delrue et al. | |
| 6,068,873 A | 5/2000 | Delrue et al. | |
| 6,265,013 B1 | 7/2001 | Martinez-Montes et al. | |
| 6,268,008 B1 | 7/2001 | Garrido et al. | |
| 6,309,688 B1 | 10/2001 | Camara et al. | |
| 6,326,045 B1 | 12/2001 | Rubio et al. | |
| 6,358,550 B2 | 3/2002 | Camara | |
| 6,383,547 B1 | 5/2002 | Delrue et al. | |
| 6,428,828 B1 | 8/2002 | Jackson et al. | |
| 6,610,349 B1 * | 8/2003 | Delrue et al. | ............... 426/622 |
| 6,638,558 B2 | 10/2003 | Brubacher et al. | |
| 6,818,240 B2 | 11/2004 | Brubacher et al. | |

OTHER PUBLICATIONS

Arambula-Villa et al., 2001, Physicochemical, structural and textural properties of tortillas from extruded instant corn flour supplemented with various types of corn lipids. Journal of Cereal Science 33, (2001) 245-252.

Cortes-Gomez, et al. May 2004, Tortillas of blue maize (*Zea mays* L.) prepared by a fractionated process of nixtamalization: analysis using response surface methodology. J. Food Engineering. 66:273-281.

(Continued)

*Primary Examiner*—Helen F Pratt
(74) *Attorney, Agent, or Firm*—Greenlee, Winner and Sullivan, P.C.

(57) ABSTRACT

The present invention provides a nixtamalization process wherein corn endosperm fractions, subfractions, or combinations thereof are individually nixtamalized to produce food products. The invention also comprises food products, including masa, instant masa, tortillas, and tortilla-related food products produced by the present invention's methods, including food products that have controllable fat and/or fiber levels.

29 Claims, 8 Drawing Sheets

OTHER PUBLICATIONS

Flores-Farias et al. 2000, Physicochemical and rheological characteristics of commercial nixtamalised Mexican maize flours for tortillas. Journal of the Science of Food and Agriculture 80: pp. 657-664 (2000).

Martin-Martinez, et al. 2003, Selective nixtamalization of fractions of maize grain (*Zea mays* L.) and their use in the preparation of instant tortilla flours analyzed using response surface methodology. Cereal Chem. 80: pp. 13-19.

Martinez-Bustos, et al., 2001, Effect of the components of maize on the quality of masa and tortillas during the traditional nixtamalisation process. J. Sci. Food Agric. 81:1455-1462.

\* cited by examiner

NIXTAMALIZATION PROCESS AND PRODUCTS PRODUCED THEREFROM

BACKGROUND OF THE INVENTION

Corn is the largest crop, in terms of volume and value, grown in the United States, with production of 228.8 million metric tons during fiscal year 2003. Whole corn kernels can be dry-milled to separate the corn into more useful components. These components can then be ingredients for various food products, and starting ingredients in a variety of non-food manufacturing/processing industries. Most of the dry-milling in the United States is done through the use of a tempering-degerming process. Sieving and aspiration of the tempering-degerming product primarily yields corn endosperm in different size fractions useful for the manufacture of various foods.

Whole corn kernels are used in the manufacture of corn tortillas in which the masa flour used to make the tortillas is prepared by a traditional method called nixtamalization. Tortilla consumption is growing in the United States, as well as in Canada and parts of Europe. The sales of corn tortilla and tortilla chips in the United States in 2000 by large manufacturers totaled $4.4 billion. It is estimated that additional sales of about $2 billion per year can be attributed to smaller tortilla processors and manufacturers.

The traditional nixtamalization process used in tortilla manufacture involves cooking corn kernels, followed by steeping the cooked kernels in an alkaline solution. Generally, the ratio of corn to solution ranges from one part of whole corn kernels to ten parts of the alkaline solution to one part whole corn to three parts alkaline solution. The solution is generally a water and lime solution with 2% by weight lime (CaO). The corn is cooked by boiling followed by a steep period, on the order of 12 hours or more. This cooking process softens the pericarp and allows the endosperm to absorb water, thus facilitating subsequent milling. After steeping, the solution is drained. The steeped corn is called nixtamal, and the solution, or cooking liquor, is called nejayote. Nejayote is a highly alkaline waste product that has a large oxygen demand, and must be disposed of properly, which significantly increases the cost of the traditional nixtamalization process. The nixtamalized kernels are then repeatedly washed with water to remove excess lime and any solubilized particles generating additional waste liquid. The cooked and nixtamalized kernels can be ground or milled, in disk mills for example, with the addition of small amounts of water. The resulting dough is called masa and is suitable for making food products, including tortillas and other related tortilla products such as corn chips, tortilla chips, taco shells and nachos.

Tortillas are made from the masa by forming thin disks of masa with an appropriate diameter (e.g. 12 to 15 cm). These disks are cooked on both sides to obtain the final tortilla product. Generally, tortillas have a relatively short shelf-life in that they quickly harden and lose their flexibility. Traditionally prepared tortillas, without additives, have a maximum shelf life of about 12 to about 15 hours, and after this time they become hard or stale. Therefore, discerning tortilla consumers obtain tortillas manufactured the same day.

Alternatively, the cooked, nixtamalized and milled kernels can be dried so that the end product is a nixtamalized corn flour (also called "instant masa" or "dry masa"). This instant masa can be shipped to tortilla manufacturers or consumers. Water is added to the instant masa to make a reconstituted masa that is used to make tortillas. However, it is generally believed that the instant masa made from the nixtamalized corn flour is inferior to fresh masa, as reflected in the final tortilla product flavor and texture. See Flores-Farias et al. (2000) J. Sci. Food Agric. 80:657-664.

The traditional nixtamalization process has several drawbacks. The process is time and energy intensive, thereby increasing the cost of the final food product. In addition, the process requires a large volume of water and generates large liquid-waste discharge, on the order of three to ten liters of alkaline water solution per kilogram of corn. Alternative technologies for producing instant masa useful in tortilla production have been examined. However, these technologies, including drum drying, micronizing (dry heat treatment), microwave heating, and extrusion have been found to result in an inferior tortilla compared to tortillas produced by traditionally nixtamalized instant masa.

Whole mature corn kernels are comprised of four components: pericarp (hull or bran), germ (embryo), endosperm and tip cap. The germ and endosperm make up approximately 83% and 11% of the whole kernel, by weight. The pericarp, which makes up approximately 5% by weight of whole kernel, surrounds the germ and endosperm. The free oil is located in the germ and the starch in the endosperm. The germ is approximately 35% oil or fat. The starch is in microscopic granular form, surrounded by proteins. The dried component of corn kernel contains approximately 72% starch, 9-10% protein, 4-5% fat or oil and the remainder is fiber, vitamins and minerals. Conventional tortilla composition is, by wet basis, approximately 50% moisture, 8-10% protein, 1.5-2.5% fiber, 1.6-2% fat, 0.8-1.2% ash, 34-38% nitrogen free extract (see U.S. Pat. No. 6,358,550).

As summarized in U.S. Pat. No. 4,594,260 the physical parameters of the nixtamalization process (e.g. water to corn ratio, lime concentration, cooking time and temperature, and washing steps) have been varied in an effort to improve the traditional nixtamalization process. More recent efforts have examined the effects of fractionating the corn kernel prior to nixtamalization thereby decreasing the volume of effluent waste. See e.g. U.S. Pat. Nos. 4,594,260, 6,265,013 and 6,358,550. However, these efforts have focused on nixtamalization of the pericarp fraction.

U.S. Pat. No. 4,594,260 separates the corn into pericarp, germ and endosperm fractions, with only the pericarp fraction nixtamalized. After pericarp nixtamalization the germ and endosperm fractions are mixed with the nixtamalized pericarp. The '260 patent reports that a main factor causing brittleness of tortillas manufactured from corn flour is that the entire corn kernel is subjected to an accelerated nixtamalization process. The traditional nixtamalization process ensures a uniform hydration of the starch contained within the endosperm, thereby avoiding excessive gelatinization and resulting in tortillas with good softness and flexibility characteristics. The '260 patent concludes that the nixtamalization of endosperm is unnecessary and undesirable and, therefore, only the pericarp should be nixtamalized. The other fractions (germ and endosperm) are instead subjected to a hydration step. It was reported that hydrated, but not gelatinized, starch yields soft, flexible and formable tortillas with excellent folding characteristics.

U.S. Pat. No. 6,265,013 separates the corn into pericarp, germ and endosperm fractions and selectively nixtamalizes the pericarp fraction. The germ and endosperm fractions are hydrated with water, and all fractions are then mixed back together to produce fresh masa or nixtamalized corn flour. Thus, the end product essentially contains the entire germ from the original corn kernel.

U.S. Pat. No. 6,383,547 discloses the use of a by-product of cereal milling as an additive to increase the strength and/or shelf life of tortillas and related products made from masa. In particular, the grain by-product is the hull or pericarp, which contains starch that has been gelatinized by cooking it in water containing an alkaline agent. The corn grain is nixtamalized separately from the corn pericarp and then mixed back together to form masa.

U.S. Pat. No. 6,358,550 separately nixtamalized the grain and the pericarp, and then mixed the grain/pericarp in a proportion of 40-45:60-55 to make dietetic corn tortillas containing conventional protein content (8-9%), with half the fat (0.7-1%), and triple the fiber (6-9%).

Without wishing to be limited to any particular theory, it is believed that the alkaline treatments and grinding modify the structure and properties of corn starch. Researchers (Gomez et al, 1990; Gomez et al, 1992) have reported the role of various corn components during nixtamalization. It has been proposed that alterations in starch crystallinity caused by cooking arise from partial starch gelatinization, limited granule swelling and disruption of the crystalline structure. During steeping, more ordered starch structures are formed, with recrystallization or annealing, continued granule swelling throughout the endosperm, and starch solubilization increases. In addition, grinding or milling of the cooked and steeped corn (the nixtamal) releases and disperses swollen starch granules.

The masa obtained from the nixtamalization process is a mixture comprising starch polymers, mixed with partially gelatinized starch granules, intact starch granules, pieces of endosperm and lipids. All of these components develop a complex heterogeneous network in a continuous water phase (Gomez et al, 1987). Additionally, the time-temperature-dependent reassociation of dispersed amylose and amylopectin continuously modifies total water content (Pflugfelder et al, 1988) and its distribution within the network.

Progress has been made in understanding nixtamalization and its effect on corn. Rooney & Suhendro (1999) suggest that lime acts on the cell wall and converts hemicelluloses into soluble gums. In the same way, the alkali-temperature treatment can gelatinize the starch and saponifies part of the lipids, releasing niacin from the niacytin complex and solubilizing a portion of the protein that surround the starch granules. Additionally, owing to the high pH, the glucan chains from amylase and amylopectin are charged, which can help slow retrogradation and improve the freshness of tortillas.

To accomplish these chemical changes and produce high-quality masa, optimal cooking and grinding conditions are believed to be required because of the importance of gelatinization levels. Small amounts of starch are gelatinized during cooking and steeping. Most gelatinization is due to attrition during subsequent corn grinding, which also disperses partially swollen granules into a matrix that act as glue, holding the masa particles together. Too much gelatinized starch, due to overcooking, produces stickiness, making the handling of masa more difficult. On the other hand, undercooking results in a non-cohesive masa that produces tortilla of poor texture; the grinding by itself cannot be used to gelatinize the starch in severely undercooked maize. Rooney & Suhendro, (1999).

Bryant & Hamaker (1997) characterized the influence of lime concentration on the gelatinization properties of maize flour. These authors reported that swelling-power, solubility, and degree of gelatinization can increase at low lime levels (<0.2%, w/v) and then decrease with increasing lime concentration. According to Martinez-Bustos et al (1998), starch crystallinity of corn meal extrudates increases when adding up to 0.15% (w/v) lime, and decreases if additional lime is added. Rodriguez et al (1996) showed that crystallinity and thermal diffusivity of corn tortillas change with lime concentration, both properties reached a maximum at a concentration of 0.2% (w/v) and tend to decrease at higher lime concentrations. However, Modragon et al, (2004) reported no effect of lime on thermal properties using differential scanning calorimetry (DSC); in general, the calcium ions provided by the lime acted as a factor for structural disorganization.

Arambula-Villa et al (2001), and Fernandez-Munoz et al (2002) have reported the importance of steeping time on the nixtamalization process. Steeping times of 4 and 7-9 h, respectively, were found sufficient to produce good quality tortillas. Cooking time is also an important factor to attain optimal nixtamal quality. The texture of fresh corn masa is affected by cook time when all other conditions are kept constant (Ramirez-Wong et al, 1994). It has been reported that the quality of tortillas depends on the method used for preparing the flour or masa (Bedolla, 1983, Arambula-Villa et al, 2001). Bedolla (1983) and Arambula-Villa (2001) report that this is due to the chemical and physical interactions that occur among the different components of corn grains (starch, lipids, fiber and proteins) and lime during the cooking process. This changes the microstructure of flour and masa, and changes their physicochemical, rheological and textural properties (Rodriguez et al, 1996). However, it has been reported that it is important that certain compounds are released from nixtamalized pericarp (gums) and nixtamalized germ (saponified lipids) in order to positively affect overall quality of the masa and tortillas in terms of rheological properties (Martinez-Bustos et al. 2001). Therefore, Martinez-Bustos et al. (2001) suggests adding the nixtamalized pericarp and germ components back together with the nixtamalized endosperm fraction.

It is generally recognized that corn physical characteristics are important factors that affect the end product obtained from the nixtamalization process. Nixtamalization variables can be manipulated, and their effect on masa and tortilla properties measured, to obtain optimal nixtamalization process variable values that produce an acceptable masa texture (Sahai et al, 2000). Sahai et al. reported that product variables such as masa texture and tortilla color were influenced not only by processing parameters (cook temperature, cook time, and steep time), but were also dependent on the initial raw material corn characteristics. Reyes-Moreno et al. (2004) used response surface methodology to report the optimum combination of nixtamalization process variables for the production of nixtamalized corn flour from whole corn kernels (quality protein maize (QPM)) (31 minutes cook time, 5.4 g $Ca(OH)_2$/l, and 8.1 hours steep time). A better understanding of the role of the components of nixtamalized corn and their effect on the quality of the masa and tortillas is important in order to develop processes that can improve the traditional tortilla-making process.

It has been suggested that undue gelatinization of the corn starch contained in the endosperm, and associated adverse rheological changes, adversely affects the end food products (e.g. tortillas). U.S. Pat. No. 4,594,260; Martinez-Bustos et al. (2001) J. Sci. Food Artic. 81:1455-62. Therefore, fractionation methods generally focus on nixtamalization of the pericarp rather than the endosperm, and do not manufacture a tortilla solely from the endosperm fraction. Martinez-Bustos (2001) ("Tortillas from nixtamal with the germ removed showed the worst texture, rollability and puffing."). Martin-Martinez et al. (2003) employed selective nixtamalization of two fractions, an endosperm fraction and a pericarp, germ, and tip cap (PGT) fraction, using response surface methodology to manufacture tortillas that had similar properties to those prepared by the traditional nixtamalization process.

They reported, however, that "[t]ortillas of good functional characteristics similar to tortillas produced by the traditional process were obtained when 5% nixtamalized fractions of PGT were blended with 95% nixtamalized endosperm."

There is a continuing need in the art for improving the masa-making process, to decrease waste effluent and increase cooking efficiency while retaining or improving tortilla quality. This invention addresses these needs.

BRIEF SUMMARY OF THE INVENTION

The invention provides a method wherein one or more food products are made from a nixtamalized endosperm fraction. The endosperm fraction can be selected from the group consisting of corn grits, corn meal and corn flour and can be purchased from commercially available sources. Alternatively, the invention can use whole corn kernels as the starting material, where endosperm is separated from the pericarp and the germ by dry milling, and the endosperm is further separated, by size, to obtain endosperm fractions and/or subfractions.

In one embodiment, a food product is produced by nixtamalizing the corn endosperm, and the corn materials other than endosperm are not added back to the nixtamalized endosperm fraction. In another embodiment, one or more endosperm fractions are separately nixtamalized to produce a food product. The food product can comprise one or more than one nixtamalized endosperm fraction. The food product can comprise only one nixtamalized endosperm fraction. The food product can comprise only two nixtamalized endosperm fractions. The food product can comprise three or more nixtamalized endosperm fractions. The food product can comprise one or more nixtamalized endosperm fractions, but not all of the endosperm.

Optionally, endosperm fractions can be more finely divided by size into subfractions of grits, meal and/or flour, and each subfraction individually nixtamalized. The food product can comprise one or more than one nixtamalized endosperm subfraction. The food product can comprise only one nixtamalized endosperm subfraction. The food product can comprise only two nixtamalized endosperm subfractions. The food product can comprise three or more nixtamalized endosperm subfractions. The food product can comprise one or more nixtamalized endosperm sub-fractions, but not all of the endosperm. Alternatively, the food product can also comprise any one or more of the nixtamalized endosperm fraction and any one or more of the nixtamalized endosperm subtractions. The food product can comprise any one or more of the nixtamalized endosperm fraction and any one or more of the nixtamalized endosperm subtractions, but not all of the endosperm.

The nixtamalization conditions of whole corn kernels are known in the art. The endosperm fractions and/or subtractions can be cooked in an alkaline solution. The solution can be made from between 0.8% and 1.2% weight by volume of lime in water. The solution can be a 1% weight by volume of lime in water. Depending on the size range of the endosperm fraction or subtraction and the initial moisture content of the fraction or subtraction, the ratio of lime solution to endosperm fraction or subtraction can range between three parts and seven parts solution to one part fraction or subtraction. The ratio of lime solution to endosperm fraction or subtraction can range between four parts and six parts solution to one part fraction or subtraction. The initial moisture content of the fraction or subtraction can be between 8% and 11%. The initial moisture content of the fraction or subtraction can be approximately 9.5%. Depending on the fraction's or subfraction's size range, the cooking time can be less than 20 minutes. Generally, the smaller the fraction or subtraction size, the lower the cooking time. Corn grits can be cooked for approximately 18 minutes. Corn meal can be cooked for approximately 15 minutes. Corn flour can be cooked for less than 15 minutes. The cooking temperature can be approximately between 80° C. and 86° C. The cooking temperature can be 83° C. for corn grits and 83° C. for corn meal. The cooked fraction or subtraction can be steeped at room temperature for between four and six hours, or until such time that no nejayote remains after steeping. The corn grits and corn flour can be steeped at 25° C. for five hours. The nixtamalized endosperm fraction or subtraction can contain between 43% and 47% moisture content. The nixtamalized endosperm fraction or subtraction can contain approximately 45% moisture content.

For the food products that comprise more than one nixtamalized fraction and/or subtraction, each nixtamalized fraction and/or subtraction can be blended immediately following steeping to obtain a homogenous blend. Alternatively, each fraction or subfraction can be dried, grounded and mixed to form a homogeneous blended instant masa.

Optionally, the non-endosperm corn kernel fractions (e.g. pericarp and/or germ) can be added to the one or more nixtamalized endosperm fractions and/or subfractions. In one embodiment, a controlled amount of germ can be added to the one or more nixtamalized endosperm fractions or sub-fractions. The non-endosperm corn fractions can themselves be nixtamalized (separate from the endosperm) or simply hydrated by cooking in water. Increasing the amount of germ added back to the nixtamalized endosperm increases the fat content of the end food product. In this manner, the fat content of tortillas can be varied from less than 10% of the fat of a conventional tortilla (e.g. approximately 0.2% fat) up to 100% (or even greater by adding excess germ) fat of a conventional tortilla (1.6 to 2% fat), and any amount between. Similarly, the method can include varying the amount of pericarp added back to control the end food product fiber level, from approximately less than 1% to greater than 100% the fiber content, and any amount between, of a conventionally nixtamalized food product.

The invention is also food products made from the methods of the present invention. The food products are of the kind that can be generally made from the traditional corn nixtamalization process, including masa, instant masa, tortillas and tortilla-related products including tortilla chips, tamales, atoles, arepas, and pupusas, and any other masa-derived food products. The invention comprises food products derived from nixtamalized corn endosperm fractions and/or subfractions that contain lower (or higher) fat and lower fiber than food products prepared by traditional nixtamalization processes. The food products can contain controllable amounts of fat by addition of controllable amounts of germ to the nixtamalized endosperm fraction(s) and/or subfraction(s). The food products can contain controllable amounts of fiber by addition of controllable amounts of pericarp to the nixtamalized endosperm fraction(s) and/or subfraction(s).

The food products, therefore, can contain any amount of germ or fiber, ranging from approximately 0% to greater than 100% of a conventionally-made food product, including between 1% and 50%, between 1% and 25%, and all sub-combinations in between. In addition, the food products can contain controllable amounts of fiber, ranging from between approximately 25% of a conventional food product to greater than 100% of the fiber contained in a conventional food product, and any sub-range between. Conventional food product refers to those foods that can be made from conventional instant masa flour, wherein the fat content of the conventional masa flour is approximately 3.5%-4% fat by weight. In one embodiment, the present invention is corn masa flour whose fat content is less than 3.7% fat by weight. The corn masa flour can have a fat content less than 2% by weight. The corn masa flour can have a fat content less than 0.5% by weight. The food product can be a low-fat or reduced-fat and high fiber corn tortilla, containing greater amounts of fiber compared to a food product made from the traditional nixtamalization process.

BRIEF DESCRIPTION OF THE DRAWINGS

FIG. 7: Photographs of tortillas made from nixtamalized corn meal compared to traditionally prepared tortillas (MASECA).

DETAILED DESCRIPTION OF THE INVENTION

Figure 1:
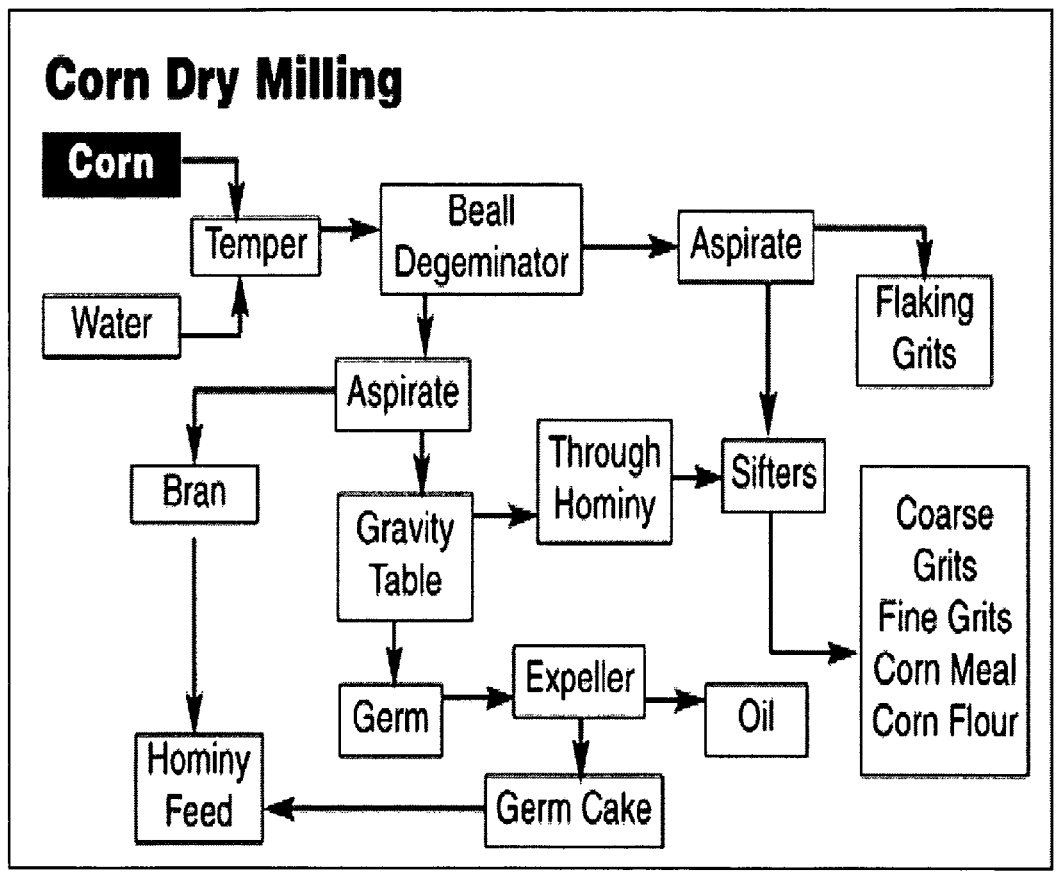
FIG. 1: Schematic representation of the steps associated with the corn dry-milling process
Figure 2:
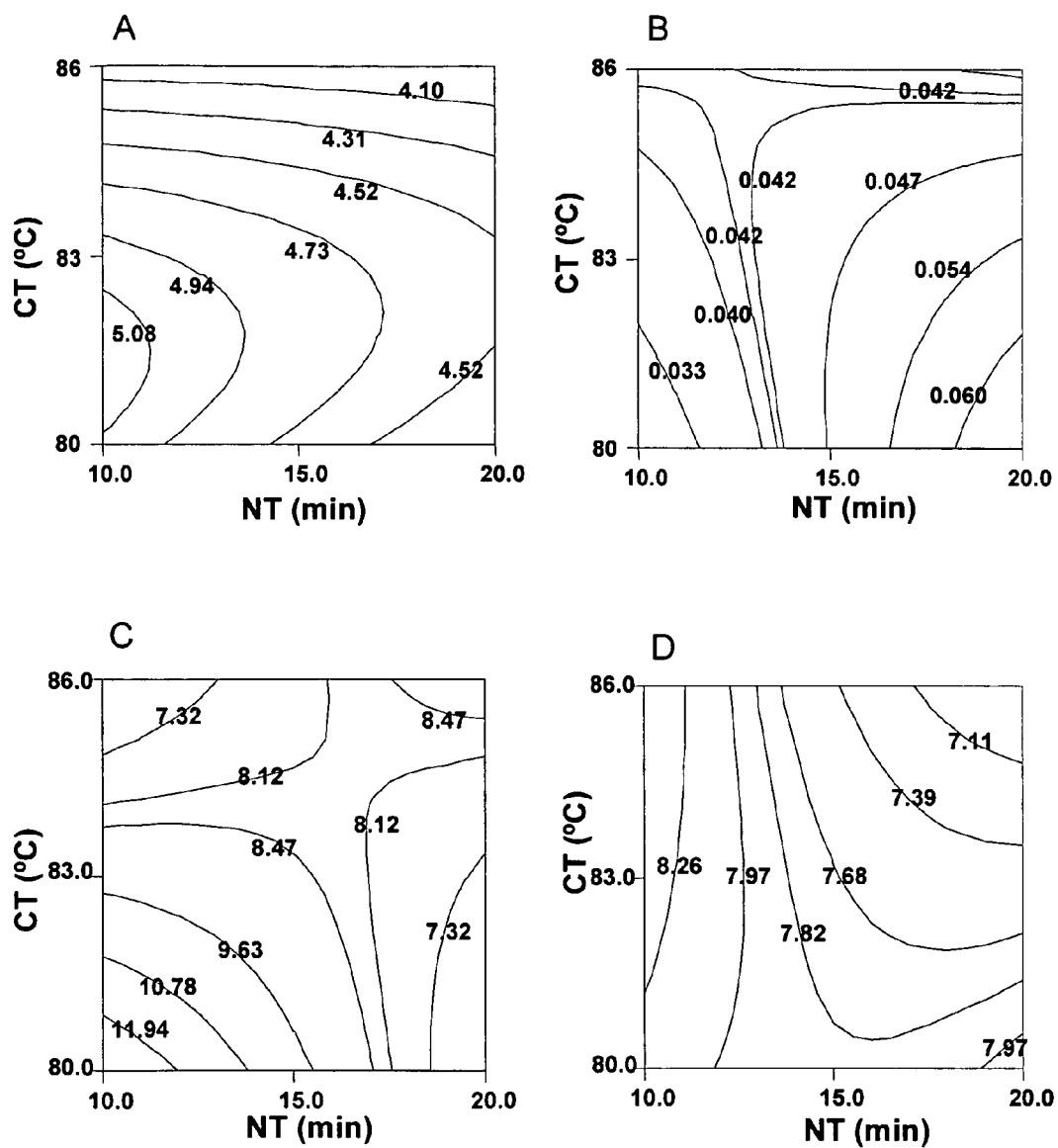
FIG. 2: Cooking Temperature (CT) and Nixtamalization Time (NT) contour plots for (A) masa hardness (MH), (B) masa adhesiveness (MA), (C) tortilla rupture force (TRF) and (D) tortilla extensibility force (TEF) for a nixtamalized corn grit fraction.

The invention may be further understood by the following non-limiting examples. Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given. In general the terms and phrases used herein have their art-recognized meaning, which can be found by reference to standard texts, journal references and contexts known to those skilled in the art. The following definitions are provided to clarify their specific use in the context of the invention. All references cited herein are hereby incorporated by reference to the extent not inconsistent with the disclosure herewith.

As used herein, "food product" includes foods made from nixtamalized corn and encompasses, masa, dry masa flour, and any product made from masa or dry masa flour. Thus, food product includes, for example, masa, tortillas, tortilla chips, tamales, atoles, arepas, pupusas and any other masa-derived food products. Masa is the resultant fresh dough obtained from traditional nixtamalization of corn kernels. Instead of making products from the fresh dough, the ground or milled nixtamalized corn kernels can be dried to obtain a flour, referred herein as "instant masa," "dry masa," or "nixtamalized corn flour." Tortillas can be made directly from the fresh masa or indirectly from instant masa by adding water to the instant masa and then making the tortilla.

"Conventional tortilla" includes tortillas made according to the traditional nixtamalization process where the endosperm portion of the corn kernel is not fractionated prior to nixtamalization. Thus, a conventional tortilla includes tortillas made from whole nixtamalized corn kernel. The typical conventional tortilla is approximately 50% moisture and contains approximately 3-5% fiber and 3-4% fat by dry weight. A conventional tortilla can also be made from nixtamalized corn fractions (e.g. one or more endosperm, germ and pericarp fractions), wherein all, or a portion of, the nixtamalized fractions are subsequently mixed together. Unconventional tortilla refers to tortillas made from the present invention wherein endosperm fractions and/or endosperm subfractions are separately nixtamalized. Conventional or traditional nixtamalization processes refer to those processes wherein the endosperm fraction is not further fractionated by size before undergoing nixtamalization.

Moisture, fat, and crude fiber content in corn fractions can be determined as disclosed in 21 C.F.R. §137.250(b)(1) (2004), which is incorporated by reference, which cites "Official Methods of Analysis of the Association of Official Analytical Chemists," 13$^{th}$ Ed. (1980), also incorporated by reference (copies may be obtained from the Association of Official Analytical Chemists International or may be examined at the Office of the Federal Register). Methods to determine moisture, fat and crude fiber content are contained in sections 14.062, 14.063, 14.065 and 14.067.

Whole corn kernels comprise pericarp (also called hull or bran), endosperm, germ and tip cap. The methods of the present invention use endosperm fractions as the starting material so that very low amounts of germ are contained within the starting material. Therefore, the amount of germ can be controlled by adding the germ fraction back to the nixtamalized endosperm fraction. In this manner, the final germ content in the food product can range from effectively 0% to greater than 100% (by adding back excess germ and/or pericarp) the germ contained in a conventional tortilla. The endosperm fractions likely contains some remnant germ pieces so that endosperm fractions can have a fat content as high as 2% in some endosperm fractions and/or subfractions. Non-removed germ can be assessed by measuring fat or oil levels within the fraction. Generally, the naturally occurring oil level in endosperm is approximately 0.4% and non-removed germ can increase this percentage to 0.7% or more. To determine the amount of germ added to a food product, the fat content of the original material can be compared to the fat content of the final product. Fat content can be measured by any means known in the art, including the method disclosed in Arambula-Villa et al. (2001). Fat can be extracted from corn grain flour using the Folch-Walsh technique. Folch (1957) J. Biol. Chem. 226:497-509. Fatty acid identity and quantification can be made using gas chromatography. Arambula-Villa (2001); Rezanka (1983) J. Chrom. 268:71-78.

The food products of the present invention can also contain reduced amounts of fiber compared to tortillas prepared by conventional nixtamalization processes. The pericarp contains approximately 51% of the kernel fiber and the germ contains approximately 16% of the fiber. S. A. Watson (1987), in Corn Chemistry and Technology, Watson and Ramstadt, ed., p. 77. In addition, the aluerone layer and the floury endosperm contain 15% and 12%, respectively, of the total fiber. The remaining hard endosperm contains approximately 6% fiber. The whole corn kernel contains approximately 9.5% fiber, and in conventional nixtamalization processes, approximately 75% of the pericarp is removed so that the fiber content in conventional tortillas is approximately 6% by dry weight. The food products of the present invention utilize hard endosperm, so that the tortillas of the present invention can contain as low as 25% the amount of the fiber content of conventional tortillas. The percentage of fiber can be increased by adding back fiber-containing corn fractions (e.g. pericarp and/or germ) to the nixtamalized endosperm fraction up to fiber levels comparable or greater than that of a conventional tortilla. Addition of excess pericarp can result in food products with greater than 100% fiber compared to a food product that nixtamalized the whole corn kernel Alternatively, the food products, including tortillas, can be reduced in both fat and fiber content compared to conventionally made tortillas. The fat content of tortillas can be less than 10% fat relative to the fat content of a conventional tortilla. The fiber content can also be reduced to as much as 25% of the fiber contained in a conventional tortilla. The fat and fiber content can also be manipulated so as to make low, reduced and regular fat and/or fiber tortillas. Low corresponds to 10%-25% the fat of a conventional tortilla and 25%-35% the fiber of a conventional tortilla. Reduced corresponds to 25%-50% and 35%-50% of the fat and fiber in a conventional tortilla, respectively. Regular corresponds to typical fat content contained in conventionally made tortillas (e.g. 50-100% fat). A food product high in fiber can contain greater than 50% and also greater than 100% the fiber contained in a conventional tortilla. The fat and fiber content can be independently controlled with respect to each other so that, for example, a low fat high fiber food product can be made using the methods of the present invention. In this manner, those of ordinary skill in the art can make any fat and fiber combination food product, particularly, masa, dry flour masa, tortillas, and tortilla-related products. A tortilla-related product includes, for example, tortilla chips, tamales, atoles, arepas, and pupusas.

Decreasing the fat content of the masa or instant masa flour can correspondingly decrease the fat content of food products made from the masa or the instant masa flour. In one embodiment, the invention comprises reduced-fat instant masa flour with less than 4% fat. The invention is also reduced-fat instant masa flour with less than 2% fat. The invention is also low-fat instant masa flour with less than 0.5% fat. In another embodiment, the invention is food products made from the masa or instant masa flour of the present invention. The food product can be a corn tortilla. The corn tortilla can comprise less than 4% fat, by dry weight. In a further embodiment, the corn tortilla can comprise less than 0.4% fat, by dry weight.

The methods of the present invention use dry milled endosperm fractions from corn kernels as the starting material in the nixtamalization process. Dry-milling is often used to refer to one of three processes: (1) tempering degerming; (2) stone-ground or nondegerming; and (3) dry grind ethanol process. Eckhoff & Paulson (1995). It is understood in the art that millers generally have their own unique variations of the overall dry-milling process. Tempering-degerming process can separate the corn into germ, pericarp and endosperm pieces.

Tempering-degerming, or "degerminating dry milling," is a common dry-milling process well known in the art. A first step in this process is to dry clean the corn, separating the fines and broken from the whole corn. Wet cleaning can follow to remove surface dirt, dust and other matter. Clean corn can be tempered to 20% moisture so that the majority of the pericarp, germ and tip cap are removed with the endosperm remaining. The bulk of the corn endosperm, called the "tail hominy fraction", can proceed through a degerminator, and be dried, cooled and sifted. A portion of this processed endosperm can be isolated as a "large flaking grit" fraction. Further size separation can be performed by using roller mills, sifters, grinding tables, gravity tables, aspirators, and the like. In this manner an essentially infinite variety of smaller-sized grits, meals and flours can be produced. See FIG. 1, from Kent et al (1994). The bran and germ components are passed through another part of the degerminator as the "through stock" stream. The germ is isolated from the bran and any remaining endosperm to produce crude corn oil, hominy feed, bran products, standard meal, prime grits, meals and flours. Oil from the germ can be recovered by either expelling and/or solvent extraction, depending on economics.

By dry milling and fractionating the endosperm, different size endosperm fractions, essentially free of other corn kernel components, can be obtained. Table 1 shows typical corn dry milling food products, industrial uses, and feed products. Common endosperm fractions obtained by dry milling and fractionation include grits, meal and flour. One advantage of the present invention is the ability to make food products from individual endosperm fractions, thereby taking advantage of price fluctuations that may occur for that individual fraction, thereby decreasing the cost of manufacturing food product. In addition, nixtamalization of individual fractions increases size uniformity of the corn particles undergoing nixtamalization, thereby resulting in more uniform cooking and a better food product.

The coarsest size fraction of corn, "large flaking grits," is obtained by passing whole corn through a degerminator system, and sifting the degerminated output through a 3½ mesh screen and over a 5 or 6 mesh screen. Further size separation can be accomplished using roller mills, sifters, grinding tables, aspirators and the like so that a continuum of size fractions can be obtained. Common food ingredients, include: Flaking Grits, Brewers Grits, Snack Meals, Dusting Meals, Fine Ground Corn Meal, Gelatinized Corn Meal, Degermed Corn Meal, Regular Corn Flour, Classified Corn Flour, Gelatinized Corn Flour, Corn Cones, Table Grits. Each of these food ingredients can have many uses for a variety of dry mixes, cereals, snack foods, brewers, breads and bread products, batters and the like.

The oil-extracted germ cake, bran, standard meal, and broken corn are generally combined, dried, and ground into hominy feed. As the major by-product of the dry corn milling process, hominy feed is used as an inexpensive, high-fiber, high-calorie ingredient in animal feed. A growing part of the dry milling industry is the less considered industrial uses. Corn flours and chemically modified corn flours can provide an inexpensive starch source used in making a variety of industrial products including insulation or fiber board, plywood and related laminating adhesives, compression-molded particle board, and wafer board. They can be used for dry wall or gypsum board binders, foundry binders, and as the adhesive or binder in the production of charcoal briquettes. Table 1 summarizes the different uses for various food products. A food product that can be beneficially made from an individual corn endosperm fraction and/or subfraction leaves the remaining corn material available for other uses.

As used herein an "endosperm fraction" refers to endosperm granululation falling within a certain size range. There are industry-recognized standards that apply size ranges to endosperm fractions. An endosperm size fraction can also be divided by size into finer subfractions with a current practical limitation of approximately 10 microns for the minimum size range. The methods of the present invention are not, however, limited to size subfractions of 10 microns, but can use any size subfraction, including subfractions spanning less than 10 microns. As used herein, endosperm fraction refers to the primary products derived from dry milling of corn, including in particular, corn meal, corn flour and corn grits, as defined by the USFDA Standards of Identity, 21 C.F.R. §137 (2004), and by the North American Millers Association; Typically, corn grit fractions range in size from 1.2 to 0.6 mm, corn meal from 0.6 to 0.2 mm, and corn flour is less than approximately 0.2 mm in size. See International Institute of Tropical Agriculture, at http://www.iita.org/info/trn_mat/irg35/irg353.html (accessed Jan. 19, 2005). Alternatively, 21 C.F.R. §§137.250 and 137.275 define a method used to identify corn meal (white or yellow) and 21 C.F.R. §§137.211 and 137.215 define a method used to identify white and yellow corn flour.

As used herein, a corn subfraction is a corn fraction that has been divided more finely by size by using roller mills, sifters, grinding tables, aspirators and the like. Generally, the finer the subfraction, the more uniform and consistent the end food product. In addition, using fractions or subfractions prior to nixtamalization can result in an effluent-free process. That is, after the steeping stage, no solution remains; all that remains is the nixtamalized endosperm fraction or subfraction, thereby abolishing nejayote production. One skilled in the art can recognize that the present invention can use any endosperm fraction, or subfraction, including those fractions or subfractions that may not have an industry recognized name.

Each endosperm fraction and/or subfraction can be nixtamalized separately to form fresh or dry masa, thereby maximizing end product granule size uniformity. Optionally, the nixtamalized fractions and/or subfraction, or any combination of the fractions and/or subfractions, can be mixed together, prior to forming masa. Mixing can affect the end food product texture because the granulation of the subfraction can affect mouth feel as well as other organolectic and textured characteristics. Therefore, the present invention can include mixing together various fractions and/or subfractions, thereby beneficially affecting end food product texture.

As used herein, "nixtamalized" or "nixtamalization" refers to the process whereby whole corn, or any corn fraction obtained therefrom, is cooked and steeped in an alkaline solution. Typically, about 0.05 to about 5 percent by weight of lime is used. The alkaline agent used in the nixtamalization process is any edible and non-toxic alkaline material. The most common material is lime (calcium oxide), but other alkaline agents, including calcium hydroxide and calcium carbonate, can be used.

Separately nixtamalizing endosperm and/or each endosperm fraction and/or each endosperm subfraction is advantageous for a number of reasons, for example: (1) optionally obtaining a low fat and/or low (or high) fiber food product by removing the germ and controlling the amount of fiber added back; (2) optimizing the nixtamalization conditions for each endosperm fraction (e.g. ratio of corn to alkaline solution, cooking temperature, nixtamalization time) eliminates effluent (nejayote), decreases processing time and water use, decreases energy consumption; (3) minimizes loss of dry mass during nixtamalization and permits utilization of other unused corn fractions, e.g., recovering/extracting corn oil from the germ while still manufacturing a satisfactory tortilla from the endosperm fraction; (4) maintains or improves the physical properties of the food product without sacrificing taste.

Tortillas made using the method of the present invention have improved properties compared to tortillas obtained from the traditional nixtamalization process. The improved product quality includes good corn flavor, excellent textural characteristics, improved tortilla puffing, and a tortilla that can retain satisfactory flexibility for up to four days. In contrast, a traditionally prepared tortilla becomes unsatisfactorily flexible on the order of hours. In addition, because the food product need not contain germ, the end food product has lower fat content and, thus, fewer calories without sacrificing taste. Instead of manufacturing a germ-containing food product, a food processor can instead capture germ, extract oil from the germ, and thereby increase profits. Cooking and steeping individual corn endosperm fractions and/or subfractions reduces the time for water and lime absorption, thereby reducing equipment cost and/or increasing the capacity of a manufacturing plant. In addition, the conditions under which each fraction and/or subfraction is nixtamalized can be individually tailored so that some fractions and/or subfractions can be over or undercooked in order to provide for the desired masa characteristics. Fractionating the endosperm and individually nixtamalizing the fractions and/or subfractions eliminates alkaline waste stream and nejayote, thereby reducing environmental concerns.

The food product can comprise any one or more nixtamalized endosperm fractions by separately nixtamalizing each fraction, and then blending any two or more of the nixtamalized endosperm fractions back together, either prior to making the fresh masa or prior to packaging the instant masa. Alternatively, the food product can comprise a single endosperm fraction, a single subfraction, or all the original endosperm material. Blending can be mixing together dry fractions or wet fractions, so long as there is a uniform consistency of the blended food product. Such a blended food product is said to a homogeneous food product. A "no germ" food product refers to a process wherein no germ is added back to the nixtamalized endosperm fraction(s) and/or subfraction(s). Thus, the no germ food products made using the present invention can contain a residual level of germ, wherein the residual level is less than 1%, by weight, germ. The amount of germ in a product can be determined by means known in the art. The germ level can be assessed by measuring the fat composition of the food product by any means known in the art. Because germ has high fatty oil content, the presence of germ in the starting material is reflected by the presence of oil or fat in the end food product. Standard staining techniques can also be used to identify germ in a food product.

Tortilla quality evaluation can be determined by a number of quantitative measures of masa, as measured by a texture analyzer or similar laboratory equipment, including masa hardness (MH), masa adhesiveness (MA), cohesiveness, chewiness, gumminess and springiness. The tortilla quality itself can be evaluated by the tortilla rupture force (TRF, in Newton's (N)), tortilla extensibility force (TEF, in N), puffing and foldability/rollability with time. These variables can be measured by techniques well known in the art to assess tortilla and masa quality, as described hereinbelow.

Optimal nixtamalization variable determination. In any nixtamalization procedure, including the methods of the present invention using endosperm fraction(s) and/or subfraction(s), the nixtamalization time (NT) and cooking temperature (CT) can be varied so as to obtain masa, nixtamalized flour, and/or tortillas with optimal quantitative and qualitative properties. Response surface methodology (RSM) is one method to determine optimal NT and CT. RSM uses a combination of experimentally measured variables and mathematical modeling to determine the optimal NT and CT for a given starting material. A standard mathematical model can be used that relates response variables $Y_K$ (MH, MA, TRF and TEF) to process variables $X_i$ (NT) and $X_j$ (CT):

$$Y_K = \beta_O + \sum_1^i \beta_i X_i + \sum_1^i \sum_1^j \beta_{ij} X_{ij}^2 + \sum_1^i \sum_1^j \beta_{ij} X_i X_j + \varepsilon$$

NT and CT can be optimized by experimentally measuring MH, MA, TRF and TEF for various NT and CT experimental conditions, and using statistical analysis with the acquired data and above equation to determine the best-fit curve for each of the response variables. The optimum NT and CT are then determined using conventional graphical methodology.

The number and range of the process variables were determined by conducting a literature search and performing preliminary experiments. For the nixtamalized corn grits and nixtamalized corn meal experiments, the process variables were NT (ranging from 8 to 22 minutes) and CT (ranging from 80 to 88° C.) and the response variables were MA and MH for masa and TRF and TEF for tortilla. A central composite experimental design with two factors (NT, CT) and five variation levels (two corners, one central, two axials) was chosen. (Myers, 1971). The RSM procedure involved measuring each of the four response variables where the masa and tortilla were made under different nixtamalization (NT, CT) conditions. The measurements were made on masa and tortillas made from the masa. From these data, contour plots for each response variable as a function of NT and CT were generated. Superposition surface methodology was used to obtain optimal (NT, CT) value for the production of optimal nixtamalized endosperm fraction. The Design-Expert Program (V 6.0.4) of the STAT-EASE software was used to perform this optimization procedure.

For example, endosperm fractions were each repeatedly nixtamalized using different NT and CT conditions and MA, MH, TRF and TEF were subsequently measured. These data are summarized in Table 2 for a corn grit fraction and Table 3 for a corn meal fraction. For each fraction, experiments were conducted for thirteen different nixtamalization time (NT) and cook temperature (CT) conditions. The values in parentheses are the coded levels. MH, MA, TRF and TEF were measured for each given NT and CT, by techniques well known in the art, as discussed hereinbelow. The data from Tables 2 and 3 were fitted to the above equation to obtain regression coefficients using commercially available statistical software (STAT-EASE, Design-Expert V 6.0.4, 2002). The regression coefficients and associated equations using statistically significant coefficients are summarized in Tables 4 and 5 for the corn grit fraction and Tables 6 and 7 for the corn meal fraction. $R^2$ is a measure of the goodness of the fit of the curve to the data ($R^2=1$ is a perfect correlation, $R^2=0$ represents no correlation). Also shown are p-values for each of the curve-fitted response variables, where $p<0.05$ is statistically significant. In Tables 4 and 6, coefficients labeled ** are statistically significant, whereas unlabelled coefficients are not statistically significant.

Figure 3:
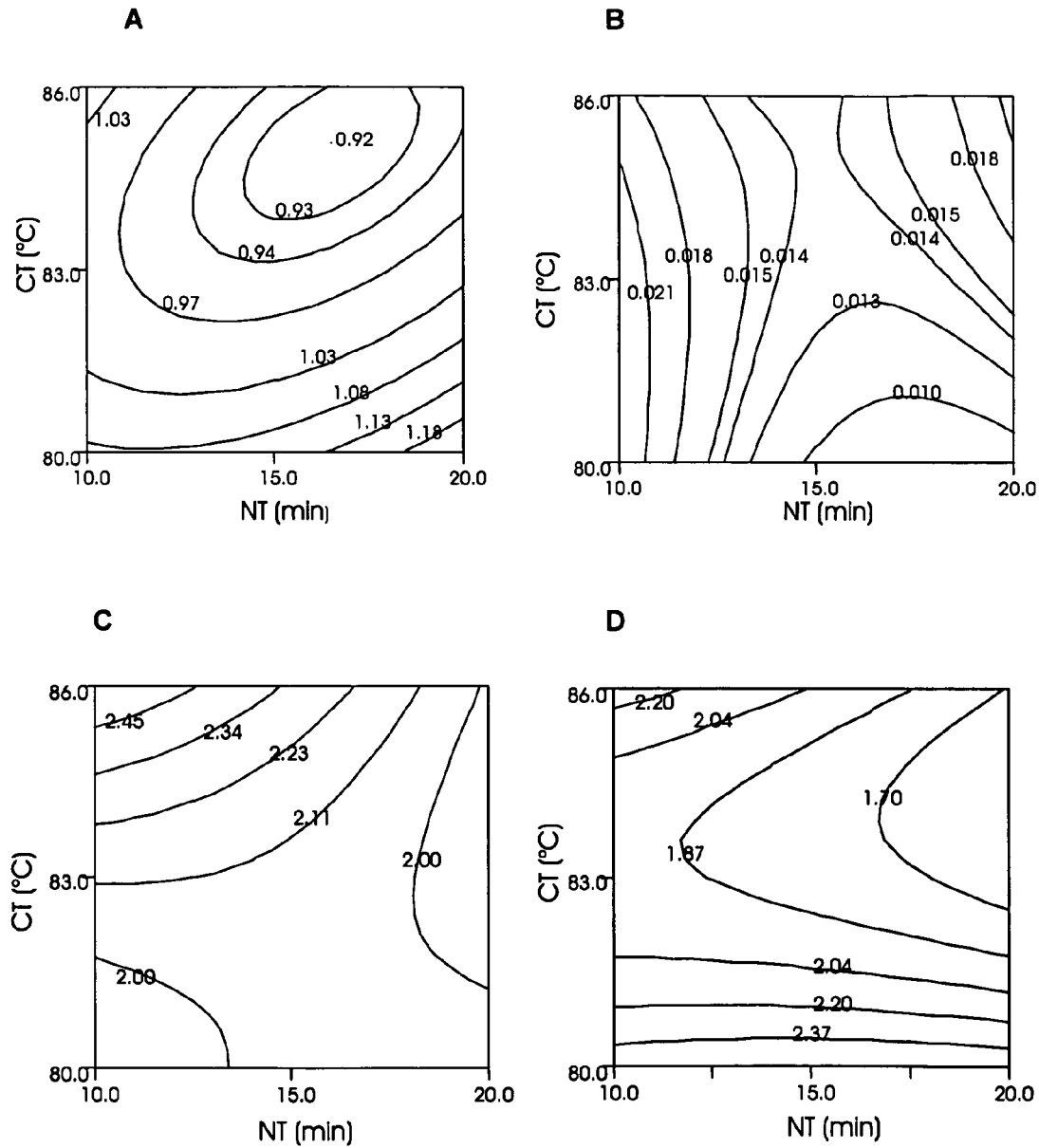
FIG. 3: CT and NT contour plots for (A) MH, (B) MA, (C) TRF and (D) TEF for a nixtamalized corn meal fraction.
Figure 4:
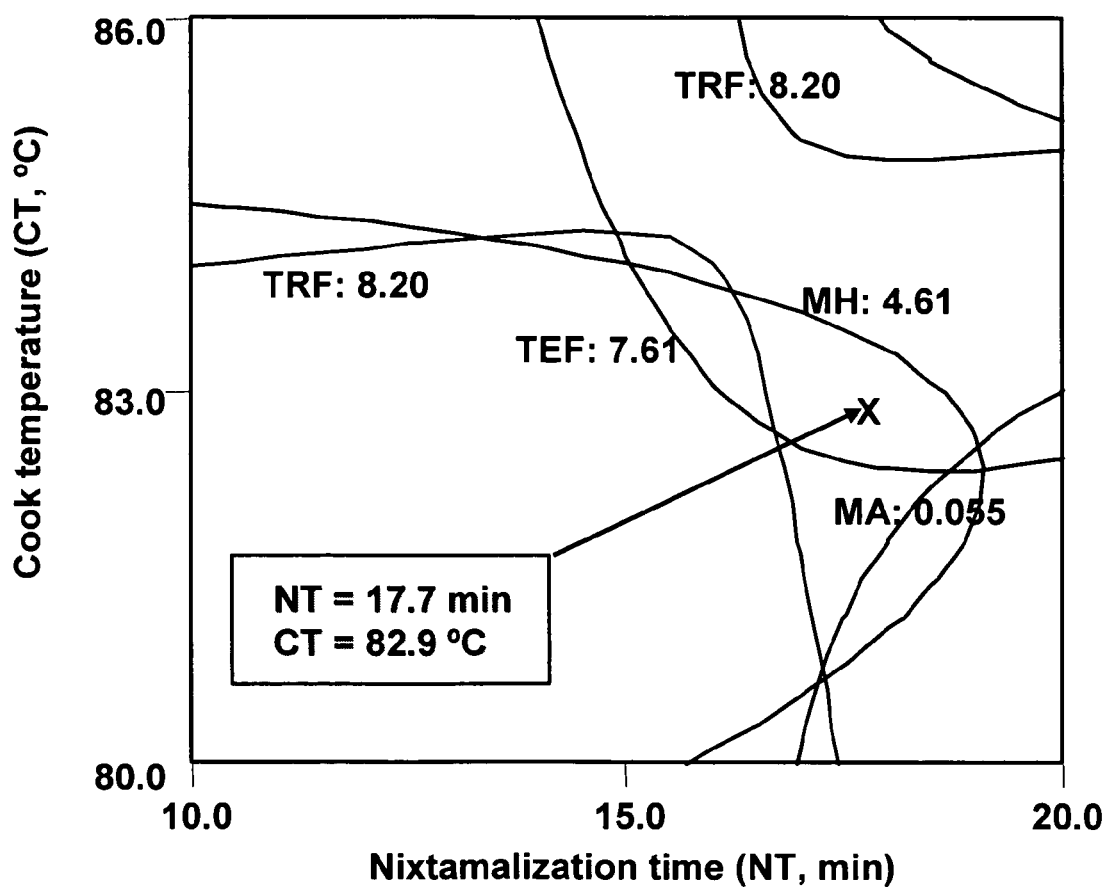
FIG. 4: Plot of each of the optimized variables, TRF, TEF, MH and MA used to graphically obtain optimal NT (17.7 minutes) and CT (82.9° C.) for a nixtamalization of a corn grit fraction.
Figure 5:
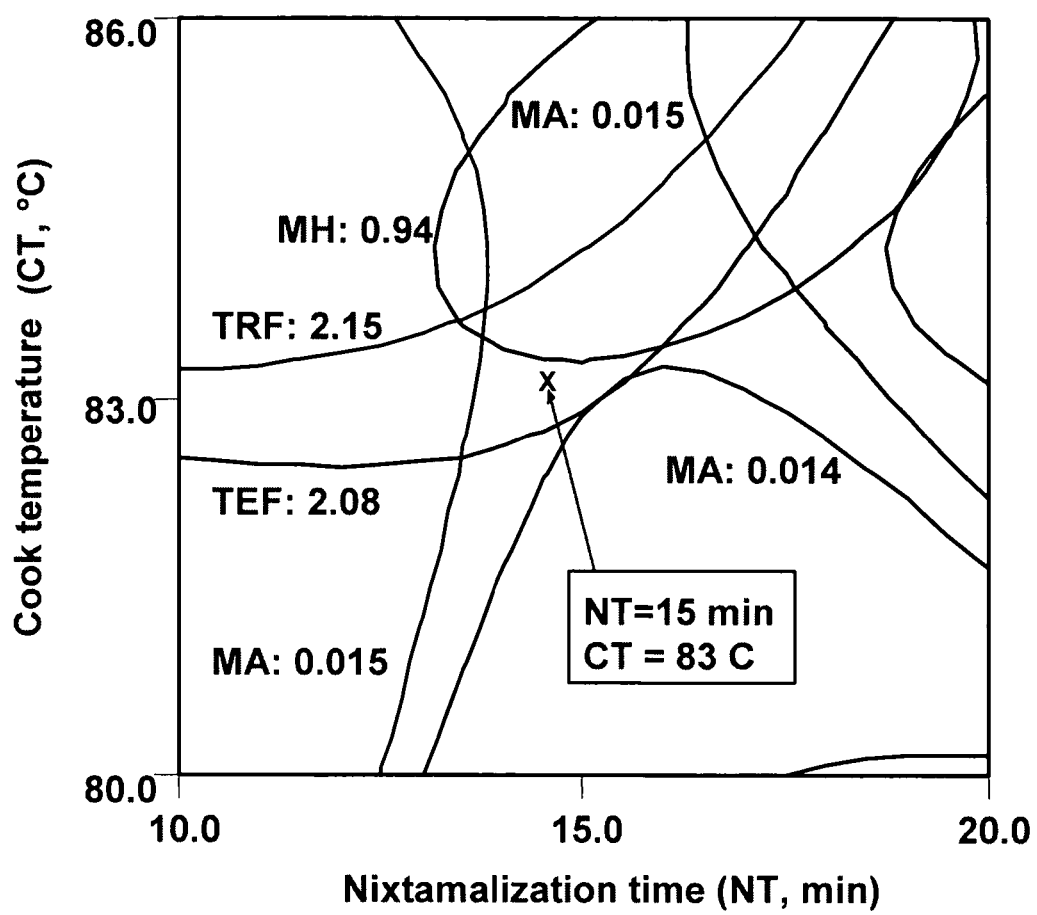
FIG. 5: Plot of each of the optimized variables, TRF, TEF, MH and MA used to graphically obtain optimal NT (15 minutes) and CT (83° C.) for a nixtamalization of a corn meal fraction.

Tables 5 and 7 summarize the best fit equations for each of MH, MA, TEF and TRF for the nixtamalized corn grit and meal fractions, respectively, using the statistically significant regression coefficients in Tables 4 and 6. The equations in Tables 5 and 7 relate each of MH, MA, TRF and TEF to CT and NT and can be plotted on contour graphs as shown in FIGS. 2(A)-(D) for the nixtamalized corn meal fraction and FIGS. 3(A)-(D) for the nixtamalized corn grit fraction. For each response variable plot in FIG. 2 and FIG. 3, an optimal response variable can be determined by conventional graphical methods. The optimum values of the response variables (corn grits: MH=4.61, MA=0.055, TEF=7.61, TRF=8.20; corn meal: MH=0.94, MA=0.015, TEF=2.08, TRF=2.15) can be plotted on a CT versus NT graph, and the optimum NT and CT values can be obtained by conventional graphical methodology as shown in FIG. 4 for nixtamalized corn grits and FIG. 5 for nixtamalized corn meal. For nixtamalization of corn grits, as determined by RSM, the optimum NT is 17.7 minutes, and optimum cooking temperature is 82.9° C. For nixtamalization of corn meal, as determined by RSM, the optimum NT is 15 minutes, and optimum cooking temperature is 83° C.

Similar analysis can be performed for any endosperm fraction or subfraction. Thereby, optimum NT and CT can be determined for each endosperm fraction or subfraction to be nixtamalized. Because an endosperm fraction (or subfraction) is more uniform in size than with traditional nixtamalization procedures that simultaneously nixtamalize all the endosperm fractions together, the reliability of the optimum NT, CT variables for a given fraction can be reliably repeated so as to maintain excellent uniformity and consistency of the end food-product. Generally, the smaller the endosperm fraction size (or subfraction), the less time is required to cook the fraction (or subfraction) to obtain satisfactory masa and/or masa flour. Therefore, in employing the RSM technique to the corn flour fraction, which is smaller in size than the meal and grit fractions, NT should be of relatively shorter duration than the NT used for nixtamalization of meal or grit endosperm fractions.

Figure 7A:
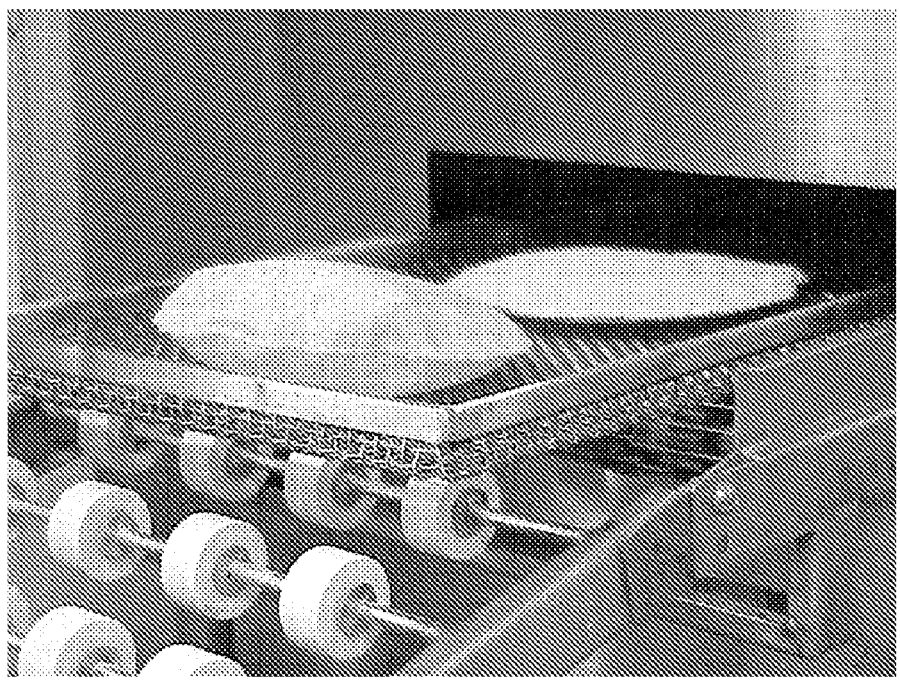
FIGS. 7A-7B show the nixtamalized corn meal tortilla to the left of the traditional tortilla immediately after baking.
Figure 7B:
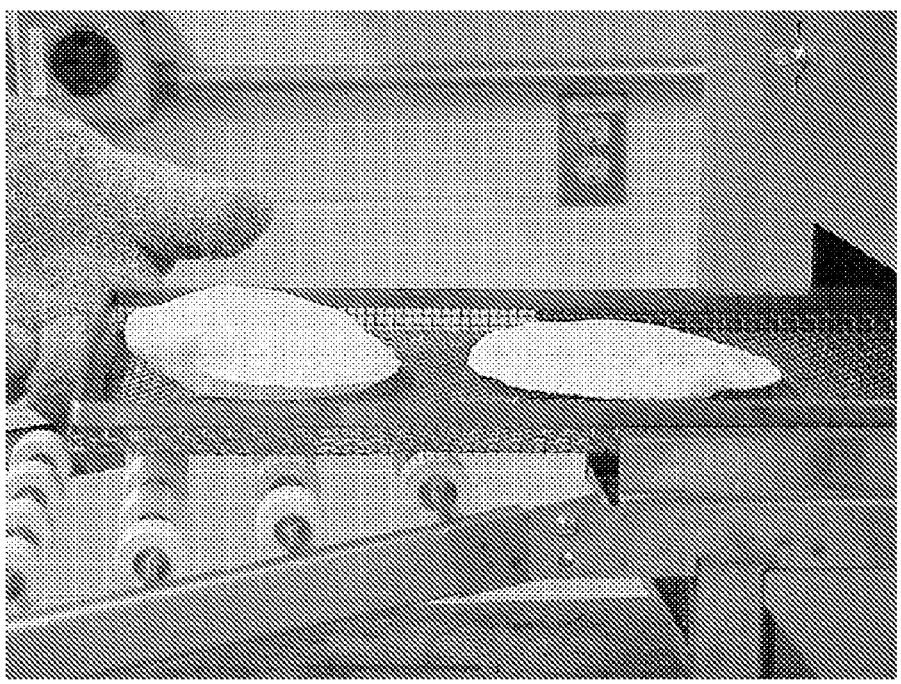
Figure 7C:
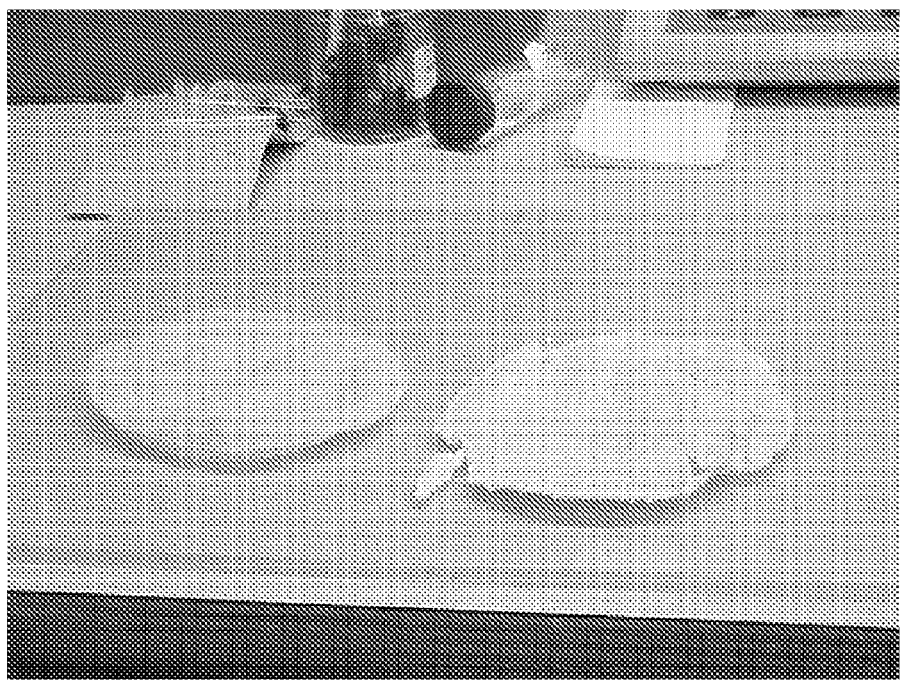
FIG. 7C shows, after approximately 15-20 minutes of cooling the nixtamalized corn meal tortilla (the tortilla on the left) retains increased puffing and cohesive characteristics compared to the conventional tortilla (on the right-side of the photograph) that exhibits crumbling.
Figure 7D:
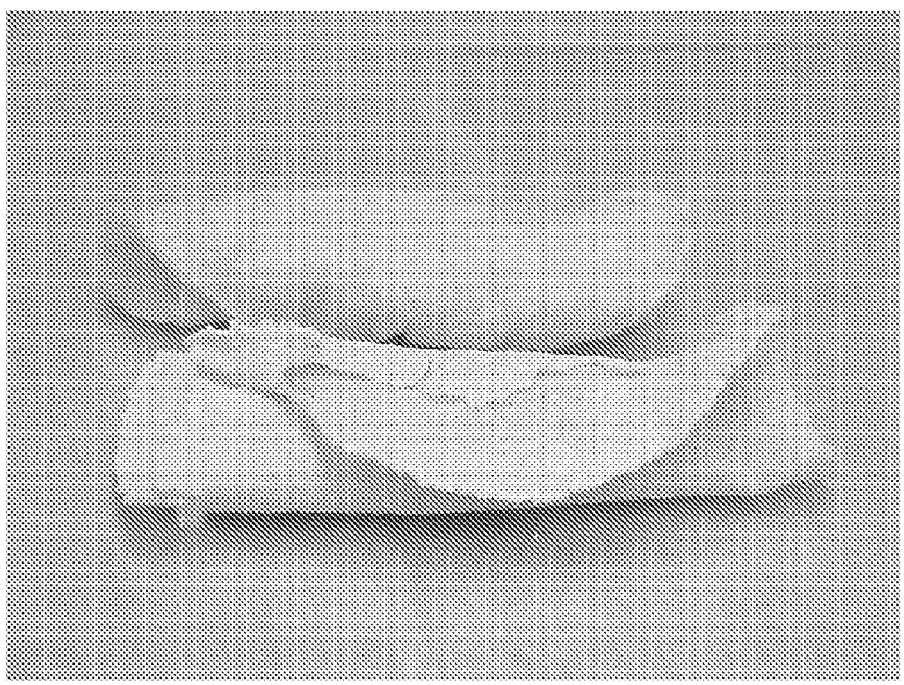
FIG. 7D demonstrates the improved foldability of the tortilla made from a nixtamalized fraction (shown on the top) compared to the conventional tortilla (shown on the bottom).

The RSM mathematical model was verified by producing food product using the RSM-determined optimum NT and CT values, from each of the corn grits and meal and comparing the physical properties to masa and tortillas made from commercially purchased masa flour (MASECA). For example, 200 g of corn grits (9.5% moisture content) can be added to 800 mL water containing 1% w/v lime and cooked at 82.9° C. for 17.7 minutes. The cooked grits can then be steeped at 25° C. for 5 hours to obtain nixtamalized corn grits with 45% moisture content. To obtain instant masa (masa flour), the nixtamalized corn grits can be dried at 49° C., cooled to 25° C., and then milled. The instant masa flour of the present invention has the beneficial property in that the flour is of more uniform size consistency. If an endosperm subfraction is used, the masa flour can be of even relatively higher consistency. Water can be added to the masa flour to form reconstituted masa dough that is sheeted, cut and baked (230° C. for 20-30 seconds per side) as is known in the art, to obtain a tortilla. The result is a qualitatively satisfactory tortilla with superior quantitative properties, including longer foldability (e.g. 4 days compared to less than one day for traditional tortillas), no fat, and increased puffing characteristics. See FIGS. 7(A)-(B). The coloring of the end food product depends on whether yellow or white corn endosperm is used as the starting material and does not affect rheological characteristics. The comparison tortilla is made from MASECA brand white masa flour. Table 8 summarizes the quantitative textural characteristics of the masa and tortillas made from nixtamalized corn grits, nixtamalized corn meal and MASECA.

Figure 6:
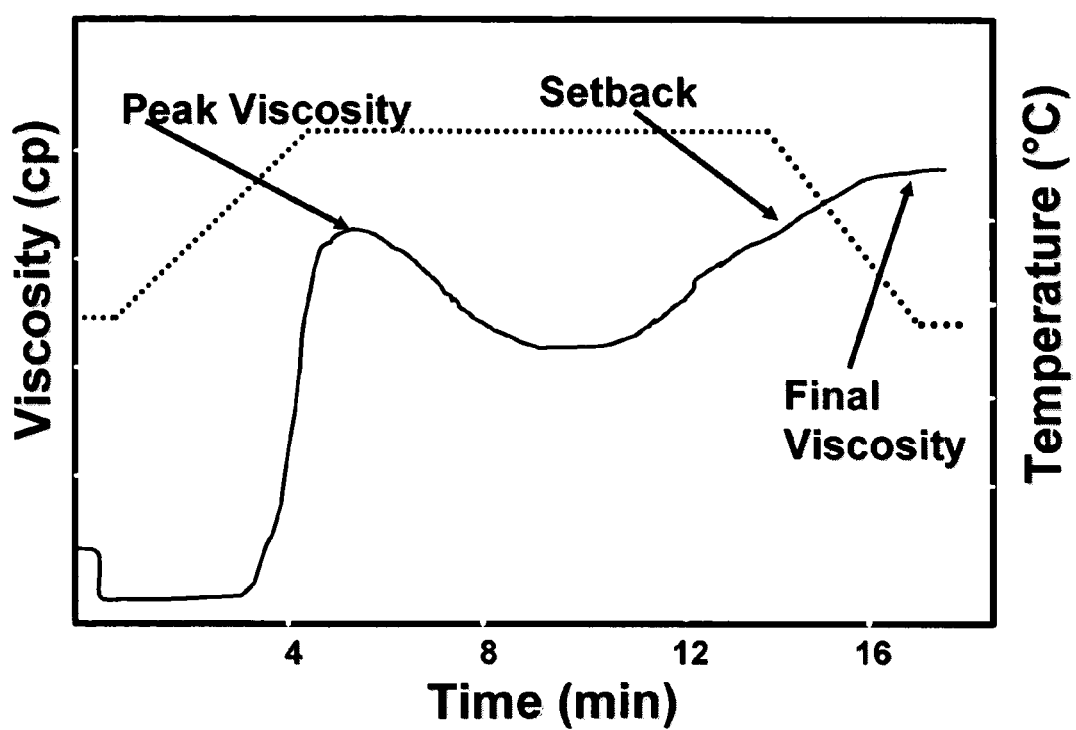
FIG. 6: Representation of viscosity measurement as a function of time and temperature used to compare the physical properties of a nixtamalized endosperm fraction (e.g. grits, meal, flour) to commercially available nixtamalized corn flour, masa and tortillas. The dashed line represents temperature and the solid line represents the viscosity in centipoise.

The optimization of CT and NT for various endosperm fractions and subfractions can be done by any means known in the art, and is not restricted to the RSM statistical analysis discussed above. Optimization is not limited to any particular statistical or measurement method. Masa and tortilla characteristics can be experimentally assessed using other quantitative variables, including viscosity, using a Rapid Visco Analyzer (RVA) as described in detail hereinbelow. The relative viscosity of masa flour, fresh masa, and tortillas (all suspended in a fluid) can be measured as a function of time and temperature, as shown in FIG. 6. FIG. 6 is a representation of a RVA Pasting Curve where the starting sample temperature is ramped up to a high temperature, the temperature is held constant for a period of time, and then the temperature is ramped down to the starting temperature. The change in temperature with time is represented by the dotted line in FIG. 6. The viscosity is represented by the solid and generally follows a typical pattern as shown in FIG. 6. As the sample initially increases in temperature the sample gelatinizes, as reflected by the increase in viscosity, to a "Peak Viscosity." As the sample is constantly stirred, and the temperature held at a higher temperature, the viscosity decreases and then increases to a "Setback Viscosity." The Setback Viscosity is measured at the time when the sample temperature is ramped down toward the starting sample temperature. The "Final Viscosity" is measured when the sample temperature equals the starting sample temperature. Such RVA pasting curves give an indication of the status of the starch granules contained within the sample and are a measure of how well the sample has cooked.

Table 9 summarizes the Peak, Setback and Final Viscosity for each of the three starting corn material (nixtamalized corn grits, nixtamalized corn meal, and MASECA brand masa flour). In addition, the viscosity was measured for each of masa flour, fresh masa and tortillas. The fresh masa and tortillas were dried to approximately 3% moisture, ground to a fine flour and suspended in water prior to testing with the RVA. All samples were tested at 14% solids by mixing 3-4 g (depending upon moisture content) of material in 28 g of water. The data in Tables 8 and 9 confirm that the masa and tortillas made using the methods of the present invention exhibit appropriate physical characteristics suitable for making higher quality tortillas.

The chemical composition of corn samples can be determined by any means known in the art, including those disclosed in AOAC $13^{th}$ ed (1980) and $14^{th}$ ed. (1984). Moisture level can be measured by drying at 105° C. for 24 h (method 925.098); incineration at 550° C. for ash (method 923.03); defatting in a Soxhlet apparatus with 2:1 chloroform/methanol for lipids (method 920.39C); microKjeldhal for proteins (N×6.25) (method 960.52).

The starting corn ingredients for the nixtamalization process are commercially available (e.g. degermed yellow corn grits, meal, flour, diet fiber corn bran, germ). The starting materials for the nixtamalized corn grit and corn meal fractions were degermed yellow corn grits and degermed yellow corn meal from Bunge Milling (Danville, Ill.). Alternatively, dry milling on whole corn kernel can be used, as known in the art, to obtain appropriate endosperm fractions and/or subfractions as described hereinbelow.

The short-flow dry-milling procedure described by Peplinski et al (1984) with modifications to pericarp and germ separation procedures can be used. Samples (500 g) of maize can be placed into plastic bags at room temperature. A three-stage tempering procedure can be used: 1) from initial moisture content to 16%, 16 hr; 2) from 16 to 21%, 1.75 hr; and 3) from 21 to 24%, 0.25 hr. Moisture can be added by spraying distilled water into the bag and mixing. The samples can be degerminated immediately following tempering using a non-commercial horizontal drum degerminator operated at 1,732 rpm idle speed at a feed rate of 3 kg/min.

The degerminated corn fraction can be screened with a 3½ mesh sieve (3½ W) for 1 min using a Great Western laboratory shaker (model 130-U, Leaventoworth, Kans.). The fraction retained on the sieve can be recycled back to the degerminator for a second pass. The total degerminated fraction can be dried in an air oven to 17±0.5% moisture content at 49° C. for classification.

The dry fraction can be classified by screening for 2 min using the sieve shaker with standard 5 W, 7 W, 10 W, 187 W, 38 W, and 66 W screens. The fractions of the 5 W through the 38 W screens can be aspirated with a Kice laboratory aspirator (model 6DT4, Wichita, Kans.) to remove the pericarp fraction. After preliminary tests, the vacuum pressure of the aspirator can be set at 12.7 kg/m$^2$ (0.5 in. water) for the 5 W, 7 W, and 10 W fractions, 7.62 kg/m$^2$ (0.3 in. water) for the 18 W fraction, and 3.81 kg/m$^2$ (0.15 in. water) for the 38 W fraction. A sodium nitrate solution can be used to float the germ from the 5 W-38 W fractions. Solution densities of 1.20 g/cm$^3$ for 5 W fraction and 1.20 g/cm$^3$ for all other fractions can be chosen. After germ separation, all germ and grit fractions can be dried for 12 h at 49° C. All yield data can be report on a dry weight basis (dwb).

Production of conventional instant masa. The procedure described by Milan-Carrillo et al (2004) can be utilized. One hundred gram lots of maize fraction can be placed in 500 mL Erlenmeyer flasks with 300 mL distilled water and 1.6 g of Ca(OH)$_2$. Flasks can be covered with aluminum foil to avoid evaporation and immersed in an 85° C. water bath. Each fraction sample can be cooked for 31 min, with samples stirred every 10 min. After cooking, flasks can be removed and placed at room temperature to steep for 8.1 h. The wet nixtamalized maize fraction can be dried for 12 h in a force air oven set at room temperature. Dry nixtamalized maize fraction can be milled (UD Cyclone Sample Mill, UD Corp. Boulder, Colo., USA), packed in plastic bags, and stored at 4° C.

Masa and tortilla measurements can be done by any means known in the art. See, e.g., Flores-Farias et al. (2000); Arambula-Villa et al. (2001); Martinez-Bustos (2001); Martin-Martinez et al. (2003); Suhendro et al. (1999) for measurement methods. In addition, the AACC (see Approved Methods of the AACC, $8^{th}$ ed. (1986), hereby specifically incorporated by reference) has also adopted methods to assess the physical properties of corn samples. Any one or more of the measured physical parameters can be used to assess food product quality.

Masa texture (cohesiveness and adhesiveness) and tortilla texture (tensile and cutting force) can be determined using a TA.XT2 texture analyzer (Texture Technologies Corp, Scarsdale, N.Y., USA/Stable Micro System, Godalming, UK). MA and MH (on a 50 g sample disk of diameter 5.4±0.1 cm and thickness 1.3±0.1 cm) can be measured by inserting a TA-18 probe (inox of 1.27 cm diameter) at a speed of 2 mm/second to a depth of 4 mm. The results can be recorded in Newtons.

The extensibility (TEF) of the tortilla can be determined by measuring tensile strength and cutting force using a TA.XT2i Texture Analyzer. TEF can be measured on a 7.2 cm by 7.2 cm tortilla sample cut from the tortilla center portion. The sample can be clamped to a TA-96 probe and attached to the head of the analyzer for uniaxial strength testing of the tortilla. Clamps can be calibrated by placing them against each other for precise separation for each run. The head can be programmed to move the upper clamp upward at 1 mm/s until tortilla breakage. TEF can be obtained from the curve by measuring the peak force and travel distance prior to ripping the tortilla.

TRF can be measured using the TA-108 tortilla film fixture. A tortilla can be prepunched with four holes and held to plates containing four alignment pins to measure tortilla stretchability, breaking point and firmness. The probe can be programmed to travel at 1 mm/s until detection of the tortilla surface. The probe can continue to travel at 1 mm/s for 20 mm, so that each tortilla ruptures. The probe can be withdrawn at 10 mm/s. The curve can be analyzed for stretchability by measuring peak force and distance to rupture each tortilla. Stretchability of a tortilla can be defined as the amount of distance it stretched and amount of force (TRF) needed to rupture the tortilla.

Tortilla rollability can be measured on tortillas 30 min and 24 hours (room temperature) post-manufacture. The rollability is quantified by rolling on a glass rod 4 cm in diameter and assigning a 1 to 5 subjective scale, where 1, 2, 3, 4, and 5 correspond to 0, 25, 50, 75 and 100% degree of breakage of the tortilla length.

Tortilla puffing can be estimated by observing the percentage of tortilla surface area that puffed on a scale from 1 to 3, where 1 corresponds to 70-100% puffing, 2 to 30-70% puffing, and 3 to 0-30% puffing.

Thermal analysis can be performed using a Differential Scanning Calorimetry (DSC) TA Instrument model 2010 (TA Instruments, New Castle, Del.) previously calibrated with indium. Powder samples (2 mg, d.b.) can be weighed directly into DSC aluminum pans, distilled water can be added with a micro-syringe to obtain a solid suspension with 65 to 75% (w/w) water content (d.b.). After sealing the pans, with the samples inside them, they can be left to reach equilibrium (15 min) at room temperature, and then heated in the device from 30 to 100° C. at a programmed speed of 10° C./minute. For each run, an empty pan can be used as reference. For the sample retrogradation analysis, samples can gelatinized, as previously described, and later stored for 24, 48, or 72 h at 4° C. Afterwards, the pans can be left to reach equilibrium (1 h at room temperature) and then heated again in the calorimeter under the sample conditions (30 to 120° C. at 10° C./minute).

Amylographic viscosity profile. A Rapid Visco Analyzer (RVA) mod. RVA-3D (New Port Scientific Pty. Ltd, Sidney, Australia) viscometer can be used. The samples (5±0.001 g) can be adjusted to 14% of moisture by weight, adding distilled water in the amount required to reach a total weight of 28 g. The sample can be placed in the instrument, which can produce a rapid agitation during 10 s and then stabilized at a constant velocity of 75 rpm. The following time-temperature program can be used: 1 min at 50° C., the temperature can then be increased to 92° C. with an approximate heating velocity of 5.6° C./min. After 5 min, the temperature can be decreased to 50° C. with an approximate cooling velocity of 5.6° C./min, and kept 1 min at 50° C. The suspension viscosity can be automatically monitored in relative viscosity units (RVU) or in units of centipoise; viscosity and temperature can be plotted as functions of time, as shown in FIG. 6.

Color of masa and tortillas. The color of the samples can be measured using a Minolta CM-2002 spectrophotometer (Minolta Camera Co, Ltd, Osaka Japan), interfaced with a computer (Minolta software), and the L, a and b values recorded.

Swelling and solubility. Swelling can be determined by the method used by Briant & Hamaker (1997): 0.25 g of sample and 5 mL of deionized water can be heated at 80 and 90° C. for 15 min in preweighted centrifuges tubes with shaking for 5 min, then the tubes can be centrifuged (1000 g for 15 min). The supernatant can be decanted, the tubes weighed and the weight gain can be used to calculate percent gain.

Particle size index (PSI). Flour samples (100 g) can be placed in a series of US standard sieves (W S Tyler Inc, Mentor, Ohio, USA) with the following sizes: no. 40=420 mm; no. 60=318 mm, no. 80=180 mm, no. 100=150 mm. Sieves can be shaken by a Ro-Tap machine (W S Tyler Inc, Mentor, Ohio, USA) for 10 min. The material retained on the sieves can be expressed as percent over. To compute the PSI of flours, the following formula can be applied: PSI=M $a_i b_i$, where, $a_i$=percentage on sieve i; $b_i$=coefficient relative to sieve i. The $b_i$ values for sieves numbers 40, 60, 80 and 100 were 0.4, 0.6, 0.8 and 1 respectively. The $b_i$ value for sieve 100 was assumed to be 1.0. (Bedolla and Rooney, 1982).

Water activity ($a_w$). This parameter can be determined in 5 g flour samples tempered at 25° C., using a Hygrometer Aqua Lab Model CX-2 (Decagon Devices Inc, Pullman, Wash., USA), which can be calibrated with a potassium chloride saturated solution ($a_w$=0.841 at 25° C.). After leaving the samples for 1 h, the headspace equilibrium can be attained and the readings taken (Milan-Carrillo et al, 2000).

Water absorption index (WAI) and water solubility index (WSI). The WAI can be assessed as described by Anderson et al (1969). Each flour sample 4-5 g can be suspended in 30 mL of distilled water in a tared 60 mL centrifuge tube. The slurry can be stirred with a glass rod for 1 min at 25° C. and centrifuged at 3000×g for 10 min. The supernatant can be poured carefully into a tared evaporating dish. The WAI can be calculated from the weight of the remaining gel and expressed as g gel/g dry flour. The WSI, expressed as grams of solids per grams of original solids, can be calculated from the weight of dry solids recovered by evaporating the supernatant overnight at 110° C.

pH. The pH values can be determined using a recording pH meter (Conductronic model pH120) according to Approved Methods 44-19 (AACC, 2000). The pH meter can be calibrated at room temperature with three different buffers (J. T. Baker standard buffer pH 4, 7 and 10). A 10-g sample can be placed in a beaker containing 100 mL of boiling distilled water and shaken (1500 rpm, 25° C., 15 min) using an orbital shaker (Cole Parmer Model 21704-10, Cole Parmer International) to homogenize the sample. The resulting suspension can be left to stand for 5 min, and pH levels measured in the supernatant liquid.

Generally, tortillas can be prepared by mixing 200 g of each corn masa flour with sufficient water to achieve an adequate consistency for the production of tortillas. Those skilled in the tortilla making art can subjectively determine when the masa is of adequate consistency. Consistency varies with the amount of water added. For example, the consistency can be deemed suitable when the masa pressed between two metallic plates covered with plastic film does not stick to them. Flores-Farias (2000). If too much water is added, the masa is soft and sticky. Too little water results in a hard masa with inferior handling properties. The masa (approximately 30 g/tortilla) can be shaped into the form of flat disc using a manual machine. The masa discs can be baked on a hot griddle at 290±10° C. for 27 s on one side, followed by 30 s on the other side, and then turned back on the first side until puffing.

FIG. 7 contains photographs of a tortilla made using the present invention's method, wherein the tortilla was made from corn meal, and a control tortilla made using conventionally-nixtamalized masa flour (MASECA). FIGS. 7(A)-(B) show the tortillas immediately after baking. The tortilla of the present invention, shown to the left of the MASECA tortilla, shows improved puffing characteristics compared to the MASECA tortilla. FIGS. 7(C)-(D) illustrate the improved adhesiveness, foldability/rollability, and shelf-life characteristics of tortillas manufactured using the method of the present invention compared to the control. The tortillas shown in FIGS. 7(C)-(D) were cooled for approximately 15 to 20 minutes. The MASECA tortilla exhibits crumbling as shown in FIG. 7(C) (rightmost tortilla) and lacks the foldability/rollability characteristics of the corn meal tortilla, as shown in FIG. 7(D) (bottom-most tortilla is the MASECA).

When a Markush group or other grouping is used herein, all individual members of the group and all combinations and subcombinations possible of the group are intended to be individually included in the disclosure. Whenever a range is given in the specification, for example, a temperature range, a time range, or a size range, all intermediate ranges and subranges, as well as all individual values included in the ranges given are intended to be included in the disclosure. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

REFERENCES

AACC, American Association of Cereal Chemists, Approved Methods of the AACC, 8th ed. American Association of Cereal Chemists, St Paul, Minn., (1986).

AACC, Approved Methods of the AACC, 10th ed., St. Paul, Minn. (2000).

Anonymous, State of the Snack Food and Wholesale Baker, Stagnito Communications Inc., Northbrook, Ill., SI-40 (2001).

AOAC, Official Methods of Analysis, 13th ed. Association of Official Analytical Chemists, Washington, D.C. (1980).

AOAC, Official Methods of Analysis, 14th ed. Association of Official Analytical Chemists, Washington, D.C. (1984).

Arambula-Villa G, Barron-Avila L, Gonzalez-Hernandez E, Moreno-Martinez E and Luna-Barcenas G, Efecto del tiempo de cocimiento y reposo del grano de maiz (Zea mays L) nixtamalizado, sobre las caracteristicas fisicoquimicas, reoogicas, estructurales y texturales del grano, masa y tortilla de maiz, Archivos Latinoamericanos de Nutricion 51:187-194 (2001).

Bedolla, S. y Rooney, L. W. 1984. Characteristics of US and mexican instant maize flours for tortilla and snack preparation. Cereal Foods World 29(11): 732-735.

Bedolla, S., De Palacios, M. G., Rooney, L. W., Ciehl, K. C. y Khan, M. N. 1983. Cooking characteristics of sorghum and corn for tortilla preparation by several cooking methods. Cereal Chem 60: 263-268.

Bello-Pérez LA, Osorio-Diaz P, Agama-Acevedo E, Núñez-Santiago C and Paredes-López O Chemical, physicochemical and rheological properties of masa and nixtamalized corn flour. Agrociencia 36:319-328 (2002).

Bryant C M and Hamaker B R, Effect of lime on gelatinization of corn flour and starch. Cereal Chem 74:171-175 (1997).

Deffenbaugh L B and Walker C E, Comparison of starch pasting properties in the Brabender Viscoamylograph and the Rapid Visco Analyzer. Cereal Chem. 66:493-499 (1989).

Eckhoff S R and Paulsen M R, Chapter 3 Maize, in Cereal Grain Quality. Henry and Kettlewell eds, 77-112 (1995).

Fernandez-Munoz J L, Rodriguez M E, Pless R C, Martinez-Flores H E, Leal M, Martinez J L and Banos L, Changes in the nixtamalized corn flour dependent on postcooking steeping time. Cereal Chem 79:162-166 (2002).

Gomez M H. Waniska R D and Rooney L W, Starch characterization of nixtamalized corn flour. Cereal Chem 68:578-582 (1991).

Martinez-Bustos F, Chang Y K, Bannwart A C, Rodriguez M E, Guedes P A and Gaiotti, Effects of calcium hydroxide and processing conditions on corn meal extrudates. Cereal Chem 75:796-801 (1998).

Martinez-Bustos F, Garcia M N, Chang Y K, Sánchez-Sinencio F and Figueroa C J D, Characteristics of nixtamalized maize fours produced with the use of microwave heating during alkaline cooking. J Sci Food Agr 80:651-656 (2000).

Mondragon M, Bello-Perez L A, Agama-Acevedo E, Betancur-Ancona D and Pena J L, Effect of cooking time, steeping and lime concentration on starch gelatinization of corn during nixtamalization. Starch/Stärke 56:248-253 (2004).

Paredes-López O, Serna-Saldívar S O and Guzmán-Maldonado S H, Los Alimentos Mágicos de las Culturas Indigenas de México-El Caso de la Tortilla. Colegio de Sinaloa (Ed). Culiacán, Sinaloa, México. pp 22-50. (2000)

Peplinski A J, Anderson A R and Alaksiewicz F B, Corn dry-milling studies: shortened mill flow and reduced temper time and moisture. Cereal Chem. 61:60-62 (1984)

Peplinski A J, Anderson R A and Eckhoff S R, A dry-Milling evaluation of trickle sulfur dioxide-treated corn. Cereal Chem 61:289-293 (1984)

Pflugfelder R L, Rooney L W and Waniska R D, Dry matter losses in commercial corn masa production. Cereal Chem 65:127-132 (1988)

Ramirez-Wong B, Sweat V E, Torres P I and Rooney L W, Cooking time, grinding, and moisture content effect on fresh corn, masa texture. Cereal Chem 71:337-343 (1994).

Reyes-Moreno C, Milan-Carrillo J, Gutierrez-Dorado R, Paredes-Lopez O, Cuevas-Rodriguez E O, Garzon-Tiznado J A, Instant flour from quality protein maize (Zea mays L). Optimization of extrusion process. Lebensmittel-Wissenschaft und-Technologie, Vol. 36, No. 7., 685.on 2004-12-28 16:32:34.

Rodriguez M E, Yanez-Limon M, Alvarado-Gil J J, Vargas H, Sanchez-Sinencio F, Figueroa J D C, Martinez-Bustos F, Martinez-Montes J L, Gonzalez-Hernandez J, Dilava M D and Miranda L C M, Influence of the structural changes during alkaline cooking on the thermal, rheological and dielectrical properties of corn starch. Cereal Chem 73:593-600 (1996).

Serna-Saldivar S O, Gomez M H and Rooney L W, The Chemistry, Technology and Nutritional Value of Alkaline Cooked Corn Products, in Advances in Cereal Science and Technology (Ed. Y. Pomeranz) St Paul, Minn. Page 243-307 (2000).

Wehling R L, Jackson D S and Hamaker B R, Prediction of corn dry-milling quality by near-infrared spectroscopy. Cereal Chem. 73:543-546 (1996).

W U Y V and Bergquist R R. Relation of corn grain density to yields of dry-milling products. Cereal Chem. 68:542-544 (1991).

Yau J C, Waniska R D and Rooney L W, Effects of food additives on storage stability of corn tortillas. Cereal Foods World 39:396-402 (1994)

Yuan J and Flores A R, Laboratory dry-milling performance of white corn: Effect of physical and chemical corn characteristics. Cereal Chem. 73:574-578 (1996).

TABLE 1

Products Manufactured by the Corn Dry Milling Industry

| Food Products | Industrial Uses | Feed Products |
|---|---|---|
| Flaking Grits | Sharp Meal (Cleaner, etc.) | Pet Food Products- Grits, Meal Flakes, Kibbles Granules |
| Brewers Grits | Core Binder (Foundry) | |
| Brewers Flakes | Fine Ground Corn Meal (Chemicals) | Hominy Feed- Regular |
| Snack Meals | | |
| Dusting Meals (Baking) | Briquette Binder | Hominy Feed |
| Whole Corn Meal | Cere-Amic Flour | Solvent |
| Fine Ground Corn Meal | Adhesive Doll Heads- Moulded Toys | Extra Extracted |
| Gelatinized Corn Meal | Diluted and Binder Insulating Materials Paints, Pastes and Glues | |
| Degermed Corn Meal | | |
| Regular Corn Flour | Scouring Agents | |
| Classified | Leather Tanning Processed | |
| Corn Flour | Flour - Oil Well Drilling Mud | |
| Gelatinized Corn Flour | Processed | |
| High Dextrin Binder | Flour - Gypsum, Textiles, Paste and Paper | |
| Corn Oil | | |
| Corn Cones | Sausage Binders | |
| Confectionery Flakes | | |
| Cereal Binders | | |
| Corn Flakes Crumbs | | |
| Self-rising Corn | | |
| Table Grits | | |

TABLE 2

Effect of Corn Grit Nixtamalization on Response Variables

| | Process Variable | | Response variable | | | |
|---|---|---|---|---|---|---|
| Assay No | NT (min) ($X_1$) | CT (°C.) ($X_2$) | MH | MA | TRF | TEF |
| 1 | 10 (−1) | 80 (−1) | 5.19 | 0.024 | 13.48 | 8.01 |
| 2 | 20 (+1) | 80 (−1) | 4.58 | 0.065 | 7.03 | 8.06 |
| 3 | 10 (−1) | 86 (+1) | 3.81 | 0.039 | 5.60 | 8.62 |
| 4 | 20 (+1) | 86 (+1) | 3.90 | 0.037 | 8.71 | 7.01 |
| 5 | 8 (−1) | 83 (0) | 5.15 | 0.035 | 9.65 | 8.91 |
| 6 | 22 (−1.414) | 83 (0) | 4.21 | 0.061 | 5.92 | 7.46 |
| 7 | 15 (+1.414) | 78 (−1.414) | 4.04 | 0.049 | 9.91 | 7.98 |
| 8 | 15 (0) | 88 (+1.414) | 3.50 | 0.041 | 8.41 | 7.10 |
| 9 | 15 (0) | 83 (0) | 4.99 | 0.041 | 8.99 | 7.84 |
| 10 | 15 (0) | 83 (0) | 4.70 | 0.050 | 8.34 | 7.62 |
| 11 | 15 (0) | 83 (0) | 4.63 | 0.047 | 9.06 | 7.44 |
| 12 | 15 (0) | 83 (0) | 4.78 | 0.044 | 8.54 | 7.86 |
| 13 | 15 (0) | 83 (0) | 4.86 | 0.049 | 8.00 | 7.73 |

Values in parentheses are the coded levels

TABLE 3

Effect of Corn Meal Nixtamalization on Response Variables

| | Process Variable | | Response variable | | | |
|---|---|---|---|---|---|---|
| Assay No | NT (min) ($X_1$) | CT (°C.) ($X_2$) | MH | MA | TRF | TEF |
| 1 | 10 (−1) | 80 (−1) | 1.04 | 0.021 | 2.43 | 1.87 |
| 2 | 20 (+1) | 80 (−1) | 1.16 | 0.012 | 2.30 | 1.91 |
| 3 | 10 (−1) | 86 (+1) | 1.09 | 0.015 | 2.23 | 2.65 |
| 4 | 20 (+1) | 86 (+1) | 0.95 | 0.023 | 1.49 | 1.91 |
| 5 | 8 (−1) | 83 (0) | 1.01 | 0.034 | 1.95 | 2.05 |
| 6 | 22 (−1.414) | 83 (0) | 1.11 | 0.018 | 1.75 | 2.01 |
| 7 | 15 (+1.414) | 78 (−1.414) | 1.30 | 0.006 | 3.26 | 2.20 |
| 8 | 15 (0) | 88 (+1.414) | 0.94 | 0.015 | 2.53 | 2.46 |
| 9 | 15 (0) | 83 (0) | 0.96 | 0.018 | 1.90 | 2.04 |
| 10 | 15 (0) | 83 (0) | 0.90 | 0.012 | 1.73 | 2.29 |
| 11 | 15 (0) | 83 (0) | 0.99 | 0.013 | 1.79 | 1.99 |
| 12 | 15 (0) | 83 (0) | 0.97 | 0.011 | 1.76 | 2.12 |
| 13 | 15 (0) | 83 (0) | 0.91 | 0.014 | 1.83 | 1.96 |

Values in parentheses are the coded levels

TABLE 4

Best-fit calculated regression coefficients for corn grit nixtamalization

| | $Y_{MH}$ | $Y_{MA}$ | $Y_{TEF}$ | $Y_{TRF}$ |
|---|---|---|---|---|
| $\beta_0$ | 4.79** | 0.046** | 7.70** | 8.59** |
| $\beta_1$ | −0.23** | 0.0095** | −0.45** | −1.08** |
| $\beta_2$ | −0.35** | −0.0030** | −0.21** | −1.04** |
| $\beta_{11}$ | −0.20 | −0.0041 | 0.26** | −0.34 |
| $\beta_{22}$ | −0.47** | −0.0019 | −0.063 | 0.35 |
| $\beta_{12}$ | 0.18 | 0.0024** | −0.41** | 2.39** |
| $R^2$ | 0.883 | 0.921 | 0.931 | 0.925 |
| p | 0.004 | 0.001 | 0.001 | 0.0001 |

TABLE 5

Best fit equations used to determine optimal nixtamalization conditions for nixtamalization of a corn grit fraction

| Variable | Best Fit Equation |
|---|---|
| MH | $Y_{MH} = 4.79 - 0.23X_1 - 0.35X_2 - 0.47X_2^2$ |
| MA | $Y_{MA} = 0.046 + 0.0095X_1 - 0.0030X_2 + 0.002447 X_1X_2$ |
| TEF | $Y_{TEF} = 7.70 - 0.45X_1 - 0.21X_2 + 0.26 X_1^2 - 0.41X_1X_2$ |
| TRF | $Y_{TRF} = 8.59 - 1.08X_1 - 1.04X_2 + 2.39X_1X_2$ |

TABLE 6

Best-fit calculated regression coefficients for corn meal nixtamalization

| Regression Coefficient | $Y_{MH}$ | $Y_{MA}$ | $Y_{TEF}$ | $Y_{TRF}$ |
|---|---|---|---|---|
| $\beta_0$ | 0.95** | 0.014** | 1.80** | 2.08** |
| $\beta_1$ | 0.0098 | 0.0029** | −0.14** | −0.095** |
| $\beta_2$ | −0.084** | 0.0022 | −0.26** | 0.14 |
| $\beta_{11}$ | 0.055** | 0.0061** | −0.041 | −0.05** |
| $\beta_{22}$ | 0.078** | 0.0017 | 0.48** | 0.10 |
| $\beta_{12}$ | −0.065** | 0.0042** | 0.15** | −0.19** |
| $R^2$ | 0.841 | 0.921 | 0.926 | 0.925 |
| P | 0.012 | 0.001 | 0.001 | 0.0001 |

TABLE 7

Best fit equations used to determine optimal nixtamalization conditions for nixtamalization of a corn meal fraction

| Variable | Best Fit Equation |
|---|---|
| MH | $Y_{MH} = 0.95 - 0.084X_2 + 0.055X_1^2 + 0.078_2^2 - 0.065X_1X_2$ |
| MA | $Y_{MA} = 0.014 + 0.0029X_1 + 0.0061X_1^2 + 0.0042X_1X_2$ |
| TEF | $Y_{TEF} = 1.80 - 0.14X_1 - 0.26X_2 + 0.48X_2^2 + 0.51X_1X_2$ |
| TRF | $Y_{TRF} = 2.08 - 0.095X_1 - 0.05X_1^2 - 0.19X_1X_2$ |

TABLE 8

Texture Profile Analysis of Masa and Tortillas

| PARAMETER | Corn Grits | Corn Meal | MASECA |
|---|---|---|---|
| Hardness | 0.823 | 1.131 | 0.828 |
| Adhesiveness | 0.015 | 0.027 | 0.011 |
| Cohesiveness | 0.258 | 0.436 | 0.218 |
| Springiness | 0.295 | 0.503 | 0.216 |
| Gumminess | 0.215 | 0.496 | 0.173 |
| Chewiness | 0.066 | 0.259 | 0.037 |
| Tensile Strength (N) | 1.93 | 2.21 | 2.47 |
| Cutting Force (N) | 1.91 | 2.48 | 1.67 |

TABLE 9

Viscosity Measured From RVA Pasting Curves

| Fraction | Corn Grits | | | Corn Meal | | | MASECA | | |
|---|---|---|---|---|---|---|---|---|---|
| Sample Type | flour | masa | tortilla | flour | masa | tortilla | flour | masa | tortilla |
| Peak | 89 | 81 | 41 | 304 | 218 | 96 | 71 | 33 | 67 |
| Setback | 626 | 339 | 195 | 1445 | 959 | 446 | 686 | 352 | 63 |
| Final | 695 | 405 | 222 | 1640 | 1450 | 519 | 733 | 367 | 122 |

We claim:

1. A method for the production of a food product from endosperm of corn kernels comprising the steps of:
   providing whole corn kernels;
   isolating endosperm from the corn kernels by removing all germ and pericarp from the corn kernels thereby generating isolated endosperm;
   separating the isolated endosperm into at least one fraction or subfraction based on endosperm granulation size, wherein each fraction or subfraction has a size range less than 0.4 mm, and said endosperm fraction or subfraction does not contain germ or pericarp;
   nixtamalizing said fraction or subfraction of the endosperm; and
   producing the food product from the nixtamalized endosperm fraction or subfraction.

2. The method of claim 1 wherein after the nixtamalizing step no nejayote remains.

3. The method of claim 1 wherein the endosperm fraction size range is less than 0.2 mm.

4. The method of claim 2 wherein the nixtamalizing step comprises:
   (a) cooking the endosperm fraction in a lime water solution, wherein the lime concentration is between 0.8% and 1.2% weight by volume, and the ratio of solution to endosperm fraction is between 4 parts and 6 parts solution to one part endosperm fraction;
   (b) cooking the fraction at a temperature of between 81° C. and 85° C. for a time between 13 minutes and 20 minutes;
   (c) steeping the cooked fraction or subfraction at a temperature between 23° C. and 27° C. for a time between 4 hours and 6 hours;
   so that after nixtamalization no nejayote remains.

5. The method of claim 4 wherein the nixtamalized fraction contains between 43% and 47% moisture content after steeping.

6. The method of claim 4 wherein the endosperm fraction has an initial moisture content of approximately 9.5%.

7. The method of claim 1 wherein multiple endosperm fractions or subfractions are separately nixtamalized, and the multiple nixtamalized endosperm fractions or subfractions are blended together before producing the food product.

8. The method of claim 1 wherein the food product comprises one nixtamalized fraction.

9. The method of claim 1 wherein the food product comprises one nixtamalized subfraction.

10. The method of claim 1 wherein the food product comprises a plurality of nixtamalized endosperm fractions, wherein each fraction has a different size range.

11. The method of claim 1 wherein the food product is selected from the group consisting of masa, instant masa, tortilla and tortilla-related products.

12. The method of claim 11 wherein the food product contains no germ.

13. The method of claim 11 wherein the food product is a tortilla.

14. The method of claim 11 wherein the food product is instant masa.

15. The method of claim 1 further comprising isolating endosperm from the corn kernel by dry-milling.

16. The method of claim 15 wherein the size range of each fraction or subfraction is less than or equal to 0.2 mm.

17. A food product produced by the method of claim 1, wherein said product comprises endosperm from corn kernels without germ or pericarp.

18. The food product of claim 17 wherein the granulation size range of the endosperm is less than 0.2 mm.

19. The food product of claim 17 wherein the food product is selected from the group consisting of corn tortilla, corn tortilla-related products, masa and instant masa.

20. The food product of claim 19 wherein the food product is instant masa.

21. The food product of claim 19, wherein the food product is a corn tortilla.

22. The corn tortilla of claim 21, wherein the corn tortilla comprises less than 4% fat by dry weight.

23. The corn tortilla of claim 21, wherein the corn tortilla comprises greater than 5% fiber by dry weight.

24. The method of claim 1, wherein said size range is selected from a range that is between than 10 μm and 0.2 mm.

25. The method of claim 1, wherein said size range is selected from a range that is between than 5 μm and 100 μm.

26. A method for the production of a food product from endosperm of whole corn kernels comprising the steps of:
   removing pericarp and germ from said whole corn kernel to provide said endosperm;
   separating said endosperm into at least one fraction or subfraction based on endosperm granulation size;
   nixtamalizing said fraction or subfraction of endosperm; and
   producing said food product from said nixtamalized endosperm fraction or subfraction.

27. The method of claim 26, wherein said endosperm fraction or subfraction has a granulation size range that is less than 0.6 mm.

28. The method of claim 26, wherein said endosperm fraction granulation size has a range that is selected from the group consisting of:
   1.2 mm to 0.6 mm:
   0.6 mm to 0.2 mm; and
   less than 0.2 mm.

29. The method of claim 28, wherein said range is 10 microns.

* * * * *